(12) United States Patent
Choi et al.

(10) Patent No.: US 10,225,056 B2
(45) Date of Patent: Mar. 5, 2019

(54) UPLINK REFERENCE SIGNAL TRANSMISSION METHOD AND DEVICE IN MILLIMETRE-WAVE-SUPPORTING WIRELESS ACCESS SYSTEM

(71) Applicant: LG ELECTRONICS INC., Seoul (KR)

(72) Inventors: Kukheon Choi, Seoul (KR); Jaehoon Chung, Seoul (KR); Genebeck Hahn, Seoul (KR); Eunjong Lee, Seoul (KR); Jinmin Kim, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 15/318,487

(22) PCT Filed: Jun. 30, 2015

(86) PCT No.: PCT/KR2015/006716
§ 371 (c)(1),
(2) Date: Dec. 13, 2016

(87) PCT Pub. No.: WO2016/003168
PCT Pub. Date: Jan. 7, 2016

(65) Prior Publication Data
US 2017/0126379 A1 May 4, 2017

Related U.S. Application Data

(60) Provisional application No. 62/020,405, filed on Jul. 3, 2014.

(51) Int. Cl.
*H04L 5/00* (2006.01)
*H04L 1/00* (2006.01)
*H04W 4/80* (2018.01)

(52) U.S. Cl.
CPC .............. *H04L 5/0048* (2013.01); *H04L 1/00* (2013.01); *H04L 1/0026* (2013.01); *H04L 5/00* (2013.01); *H04L 5/0057* (2013.01); *H04W 4/80* (2018.02)

(58) Field of Classification Search
CPC ... H04L 5/0048; H04L 5/0057; H04L 1/0026; H04L 1/00; H04L 5/00; H04W 4/008; H04W 4/80
See application file for complete search history.

(56) References Cited

U.S. PATENT DOCUMENTS 9,439,096 B2 * 9/2016 Josiam ................... H04W 24/10
2010/0203839 A1 * 8/2010 Duan ......................... H04L 1/20
455/67.11

(Continued)

FOREIGN PATENT DOCUMENTS

JP 2010-187359 A 8/2010
KR 10-2009-0009223 A 1/2009
(Continued)

OTHER PUBLICATIONS

Al-Hourani et al., "Path Loss Study for Millimeter Wave Device-to-Device Communications in Urban Environment," 2014 IEEE International Conference on Communications Workshops (ICC), W8: Workshop on 5G Technologies, XP032630892, Jun. 10, 2014, pp. 102-107.

*Primary Examiner* — Ivan O Latorre
(74) *Attorney, Agent, or Firm* — Birch, Stewart, Kolasch & Birch, LLP

(57) ABSTRACT

The present invention provides a method for defining, and for transmitting, a new uplink reference signal and devices supporting the method. In one embodiment of the present invention, a method in which a terminal transmits a millimetre wave reference signal (mW-RS) in a millimetre-wave (mmWave)-supporting wireless access system comprises the (Continued)

steps of: receiving a downlink reference signal in a predetermined number of sub-frames, and measuring two or more received power levels; determining whether to transmit an mW-RS, based on the value(s) of the difference(s) between the two or more received power levels; and transmitting the mW-RS if it has been decided to transmit an mW-RS. Here, the mW-RS is transmitted in order to measure whether the state of a wireless channel has transitioned between an LoS (Light of Sight) state and a NLoS (Non-LoS) state.

8 Claims, 29 Drawing Sheets

(56) References Cited

U.S. PATENT DOCUMENTS

| | | | | |
|---|---|---|---|---|
| 2011/0194485 | A1* | 8/2011 | Horneman | H04W 72/042 370/315 |
| 2011/0292823 | A1* | 12/2011 | Barbieri | H04L 5/0057 370/252 |
| 2012/0162012 | A1* | 6/2012 | Marzouki | G01S 3/72 342/378 |
| 2013/0210435 | A1 | 8/2013 | Dimou et al. | |
| 2013/0235742 | A1* | 9/2013 | Josiam | H04W 24/10 370/252 |
| 2013/0315321 | A1* | 11/2013 | Rajagopal | H04L 27/2607 375/260 |
| 2013/0322349 | A1* | 12/2013 | Hosangadi | H04L 1/0005 370/329 |
| 2014/0329520 | A1* | 11/2014 | Militano | H04W 24/02 455/422.1 |
| 2014/0369435 | A1* | 12/2014 | Kneckt | H04B 7/0413 375/267 |
| 2016/0119915 | A1* | 4/2016 | Simonsson | H04L 5/0048 370/329 |
| 2016/0262156 | A1* | 9/2016 | Yilmaz | H04W 72/0453 |

FOREIGN PATENT DOCUMENTS

| | | |
|---|---|---|
| KR | 10-2010-0036906 A | 4/2010 |
| KR | 10-2013-0103449 A | 9/2013 |
| KR | 10-2014-0080320 A | 6/2014 |

* cited by examiner

FIG. 10
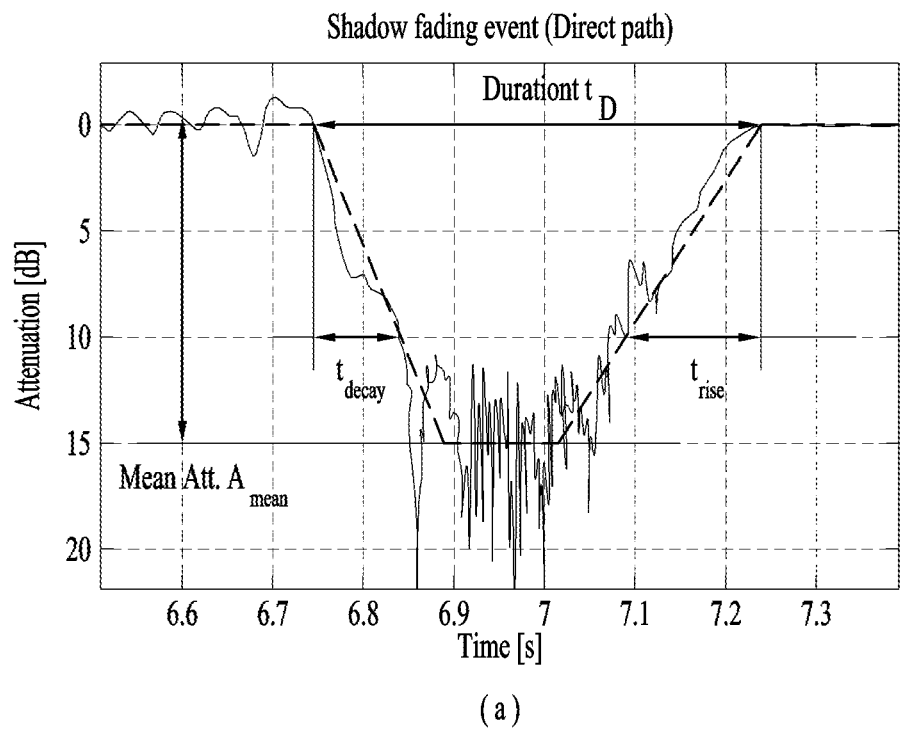
(a)
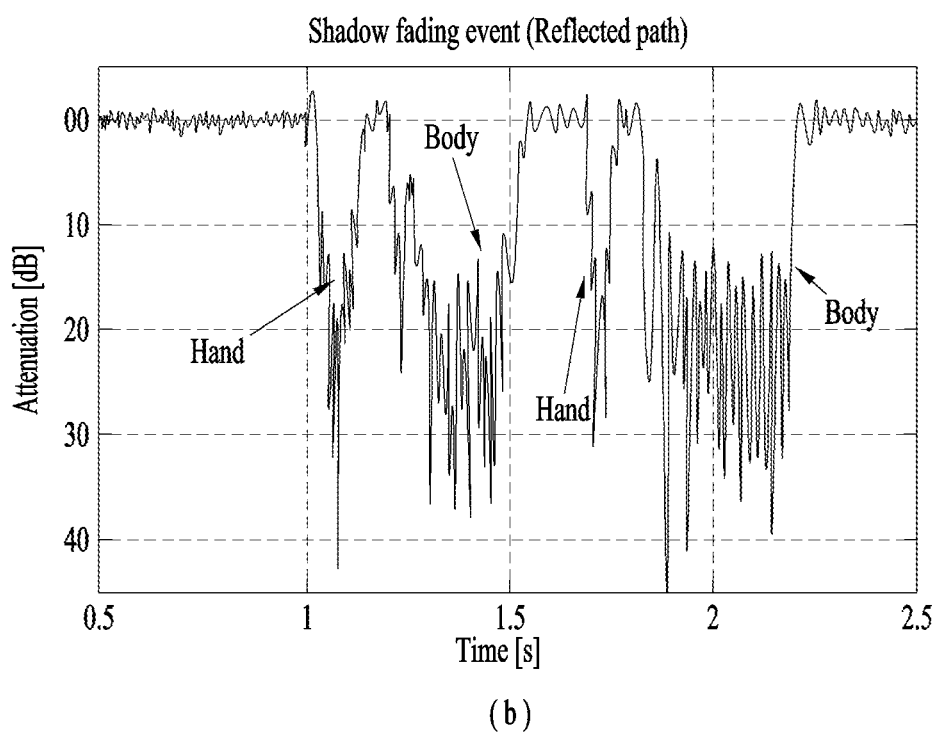
(b)

UPLINK REFERENCE SIGNAL TRANSMISSION METHOD AND DEVICE IN MILLIMETRE-WAVE-SUPPORTING WIRELESS ACCESS SYSTEM

CROSS REFERENCE TO RELATED APPLICATIONS

This application is the National Phase of PCT International Application No. PCT/KR2015/006716, filed on Jun. 30, 2015, which claims priority under 35 U.S.C. 119(e) to U.S. Provisional Application No. 62/020,405, filed on Jul. 3, 2014, all of which are hereby expressly incorporated by reference into the present application.

TECHNICAL FIELD

The present invention relates to a wireless access system supporting a millimeter wave (mmWave). In the present invention, a new uplink reference signal for detecting whether a transition is performed between a LoS state and an NLoS state is defined. More particularly, the present invention is directed to a method of transmitting the new uplink reference signal and device for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

Recently, due to entry into a hyper-connected society and appearance of big data accompanied with the development of new paradigms of mobile smart devices and services, mobile traffic has doubled every year. The communication business expects that the mobile traffic will be increased more than 1000 times in ten years. In addition, the rapidly increased mobile traffic may also increase the burden of mobile network providers. However, improvement of traffic capacity required to cope with the excessively increased mobile traffic cannot be achieved in the conventional mobile communication system where acquisition of additional frequency resources is limited. Therefore, 5G mobile communication technology based on the millimeter wave needs to be developed to secure broad bandwidth.

DISCLOSURE OF THE INVENTION

Technical Task

The present invention relates to a wireless access system supporting an mmWave. In the present invention, a new uplink reference signal for detecting whether a transition is performed between a LoS state and an NLoS state is defined. Specifically, the present invention provides a method of transmitting the new uplink reference signal and devices for supporting the same.

An object of the present invention is to provide a method for efficiently transmitting and receiving signals in an mmWave system.

Another object of the present invention is to provide a method for rapidly detecting a transition from the LoS state to the NLoS state in the mmWave system.

Another object of the present invention is to provide a method for configuring and transmitting a new uplink reference signal used in the mmWave system.

Another object of the present invention is to provide a channel state measurement method, which is not only suitable for the mmWave system but also can minimize change in the legacy system.

A further object of the present invention is to provide devices to which the aforementioned methods can be applied.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

The present invention defines a new uplink reference signal and provides a method of transmitting the new uplink reference signal and devices for supporting the same.

In one technical aspect of the present invention, provided herein is a method of transmitting millimeter wave reference signals (mW-RSs) by a user equipment in a wireless access system supporting a millimeter wave (mmWave), including: measuring at least two reception powers by receiving downlink reference signals in a predetermined number of subframes; determining whether to transmit the mW-RSs based on a difference value between the at least two reception powers; if it is determined to transmit the mW-RSs, transmitting the mW-RSs, wherein the mW-RSs is transmitted to measure whether a state of a radio channel is transitioned between a LoS (Line-of-Sight) state and an NLoS (Non-LoS) sate.

The method may further include transmitting channel quality indicator (CQI) information in a predetermined subframe.

In this case, the mW-RSs may be transmitted in a subframe next to the predetermined subframe.

In this case, the CQI information may further include a 1-bit flag indicating whether the mW-RSs are transmitted.

Alternatively, the CQI information may further include at least one of the flag indicating whether the mW-RSs are transmitted, a field indicating a transmission length of the mW-RSs, a filed indicating the number of mW-RSs, a filed indicating whether the mW-RSs are transmitted periodically, and a filed indicating whether the transmission of the mW-RSs are released or continued.

The method may further include receiving an index ($I_{MCS}$) indicating a modulation and coding scheme (MCS) adjusted based on the CQI information and the mW-RS s.

In another technical aspect of the present invention, provided herein is a user equipment for transmitting millimeter wave reference signal (mW-RSs) in a wireless access system supporting a millimeter wave (mmWave), including: a transmitter; a receiver; and a processor configured to support the mmWave by controlling the transmitter and the receiver. In this case, the processor may receive downlink reference signals in a predetermined number of subframes using the receiver, measure at least two reception powers, determine whether to transmit the mW-RSs based on a difference value between the at least two reception powers, and if it is determined to transmit the mW-RSs, control the transmitter to transmit the mW-RSs. Further, the mW-RSs may be transmitted to measure whether a state of a radio channel is transitioned between a LoS (Line-of-Sight) state and an NLoS (Non-LoS) sate.

In this case, the processor may be further configured to transmit channel quality indicator (CQI) information in a predetermined subframe by controlling the transmitter.

The mW-RSs may be transmitted in a subframe next to the predetermined subframe.

In this case, the CQI information may further include a 1-bit flag indicating whether the mW-RSs are transmitted.

Alternatively, the CQI information may further include at least one of the flag indicating whether the mW-RSs are transmitted, a field indicating a transmission length of the mW-RSs, a filed indicating the number of mW-RSs, a filed indicating whether the mW-RSs are transmitted periodically, and a filed indicating whether the transmission of the mW-RS is released or continued.

The processor may be further configured to receive an index ($I_{MCS}$) indicating a modulation and coding scheme (MCS) adjusted based on the CQI information and the mW-RSs through the receiver.

It is to be understood that both the foregoing general description and the following detailed description of the present invention are exemplary and explanatory and are intended to provide further explanation of the invention as claimed.

Advantageous Effects

As is apparent from the above description, the embodiments of the present invention have the following effects.

First, a base station and/or a user equipment can rapidly check a transition between LoS and NLoS states.

Second, backward compatibility with the legacy system can be guaranteed by designing an mW-RS in consideration of conventional CQI transmission.

Third, when a transition occurs between LoS and NLoS states, scheduling information such as MCS can be instantaneously adjusted to adapt to a corresponding channel environment and thus communication can be performed efficiently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

DESCRIPTION OF DRAWINGS

The accompanying drawings, which are included to provide a further understanding of the invention, illustrate embodiments of the invention and together with the description serve to explain the principle of the invention.

FIG. 10 is a diagram illustrating a case in which an mmWave signal is attenuated by a human body.

BEST MODE FOR INVENTION

Figure 1:
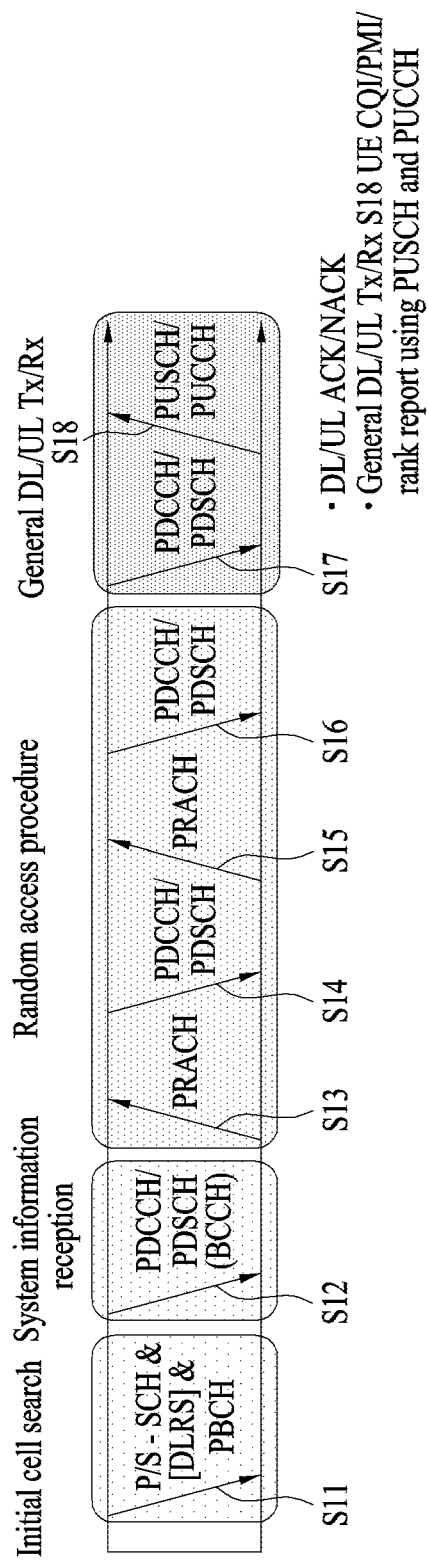
FIG. 1 is a conceptual diagram illustrating physical channels used in the embodiments and a signal transmission method using the physical channels.

In the embodiments of the present invention, which will be described in detail below, a new uplink reference signal is defined and a method of transmitting the new uplink reference signal and device for supporting the same are provided.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present invention (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, a data block is interchangeable with a transport block in the same meaning. In addition, the MCS/TBS index table used in the LTE/LTE-A system can be defined as a first table or a legacy table, and the MCS/TBS index table which is used for supporting the 256QAM can be defined as a second table or a new table.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
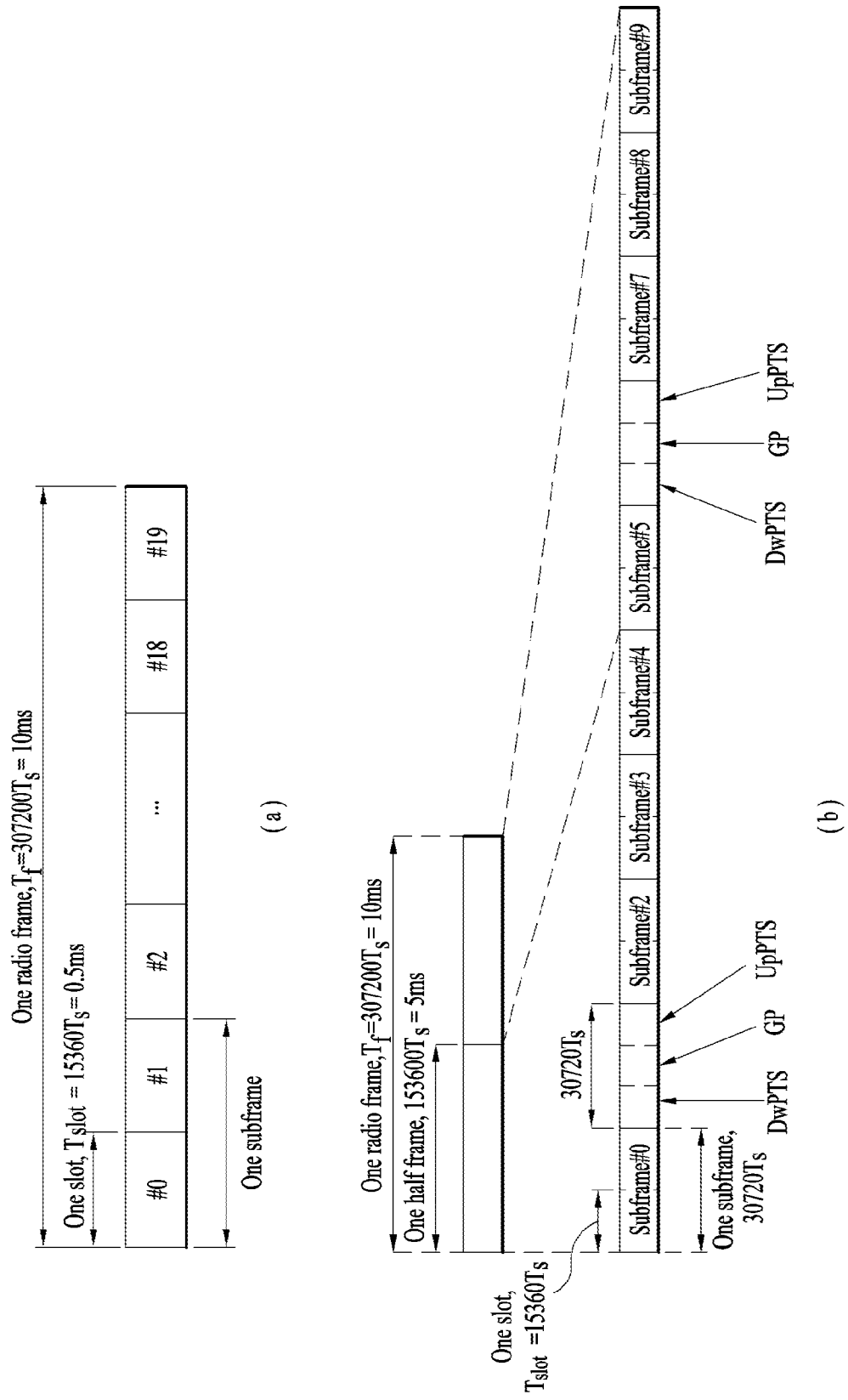
FIG. 2 is a diagram illustrating a structure of a radio frame for use in the embodiments.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s = 1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-TDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f = 307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot} = 15360 \cdot T_s$). $T_s$ is a sampling time given as $T_s = 1/(15 \text{ kHz} \times 2048) = 3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |

TABLE 1-continued

|  | Normal cyclic prefix in downlink | | | Extended cyclic prefix in downlink | | |
| --- | --- | --- | --- | --- | --- | --- |
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 7 | $21952 \cdot T_s$ | — | — | — | — | — |
| 8 | $24144 \cdot T_s$ | — | — | — | — | — |

Figure 3:
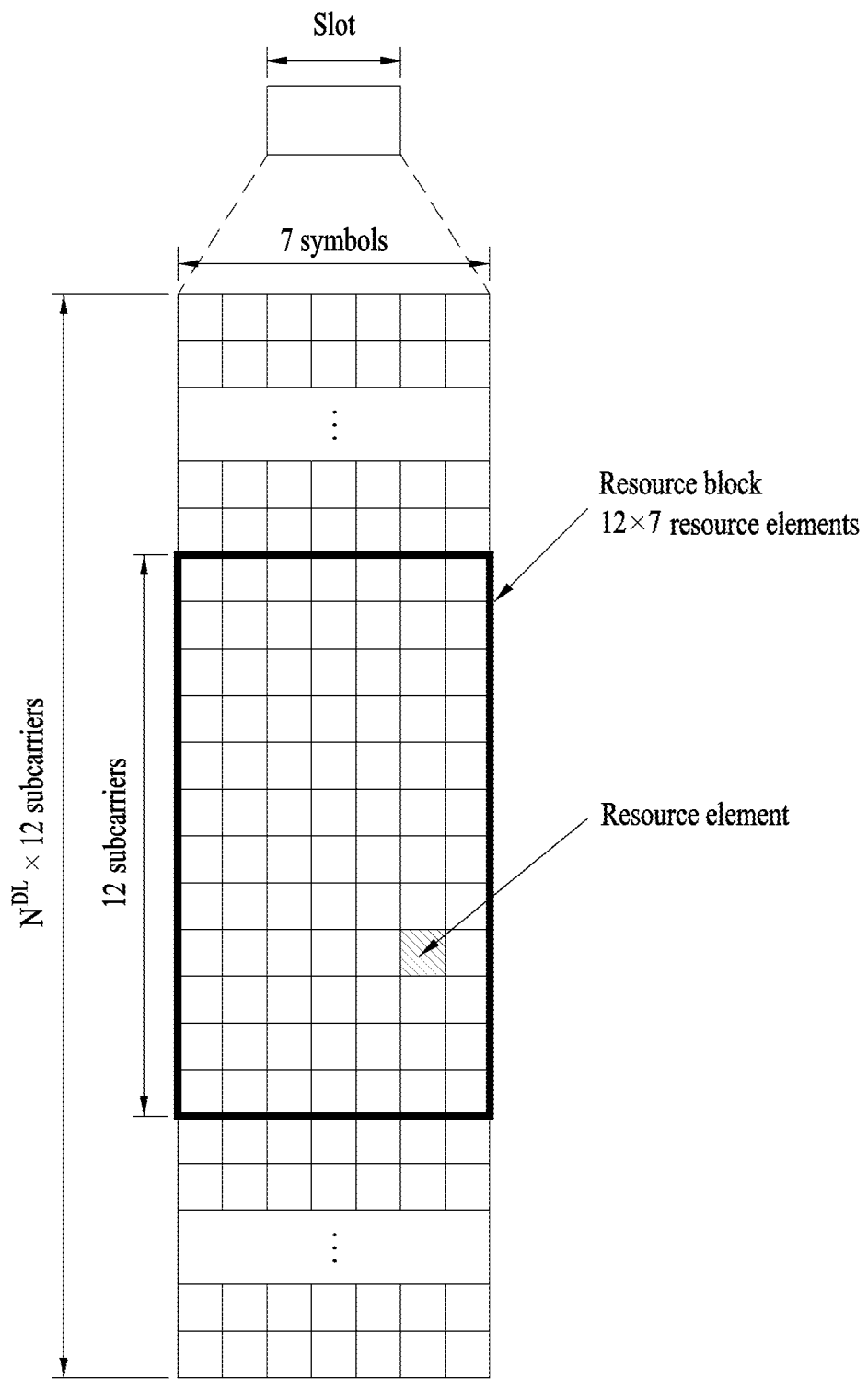
FIG. 3 is a diagram illustrating an example of a resource grid of a downlink slot according to the embodiments.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 4:
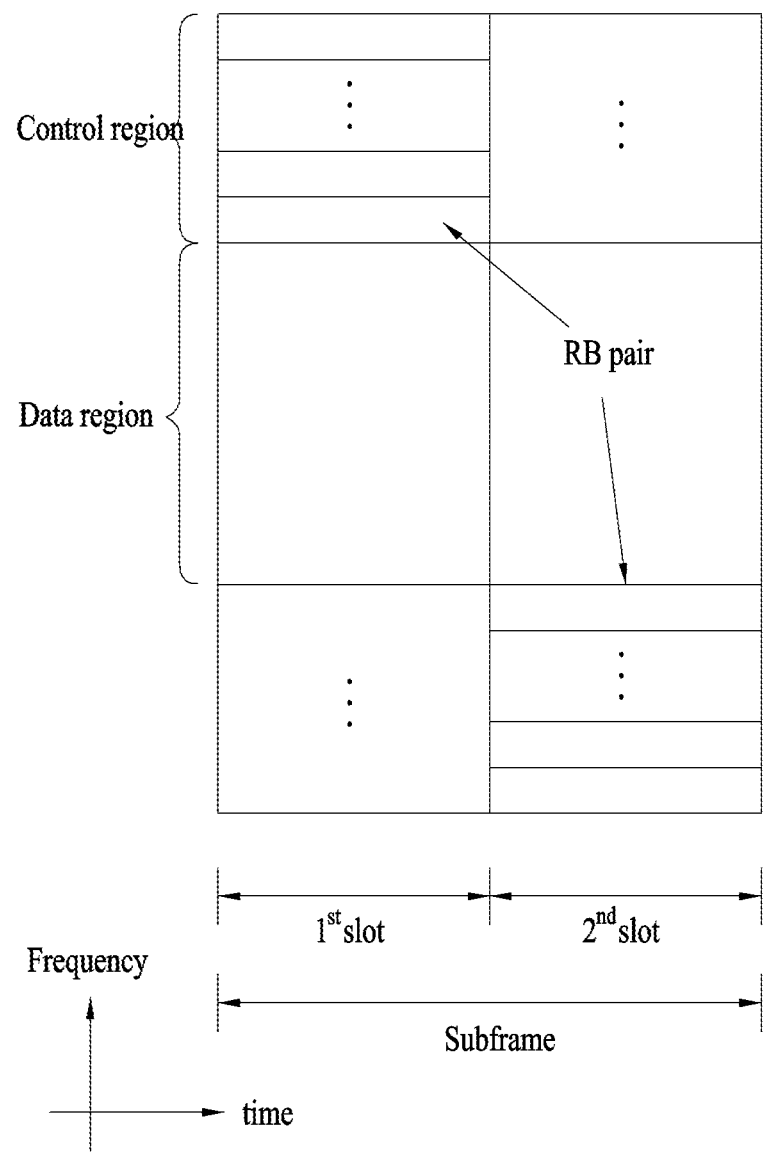
FIG. 4 is a diagram illustrating a structure of an uplink subframe according to the embodiments.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
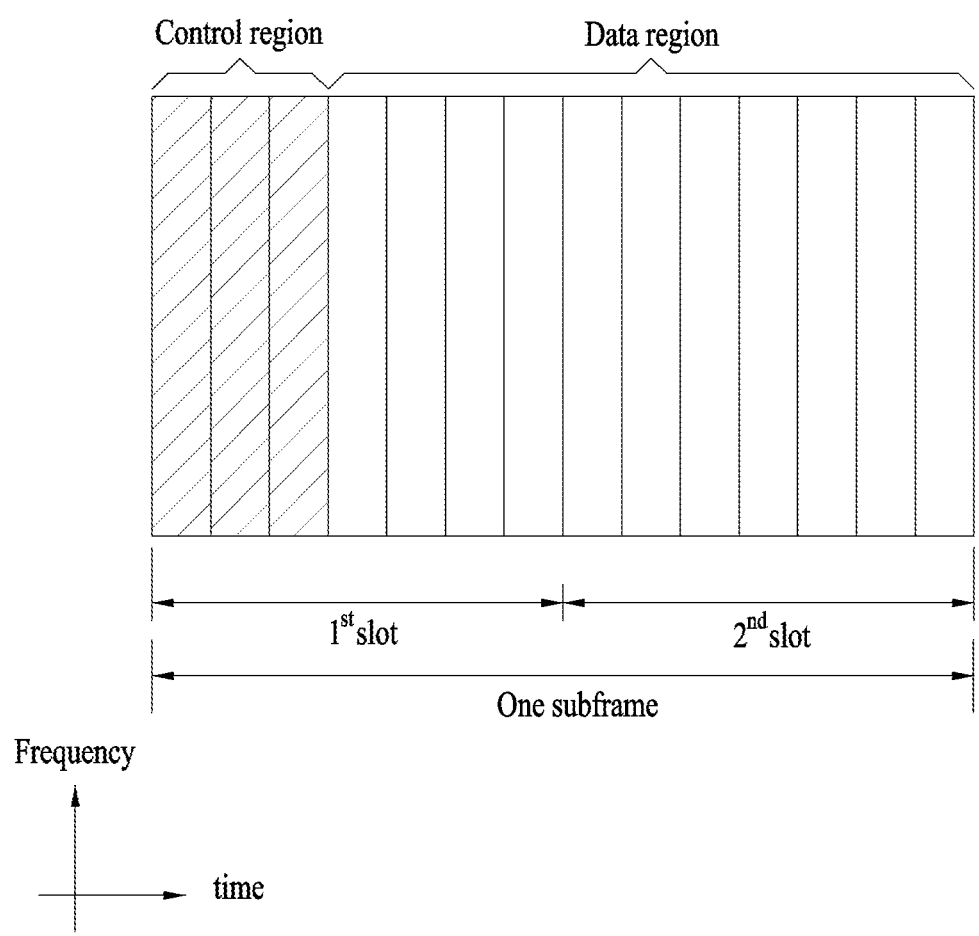
FIG. 5 is a diagram illustrating a structure of a downlink subframe according to the embodiments.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2 Carrier Aggregation (CA) Environment 1.2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present disclosure, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present disclosure may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present disclosure.

Figure 6:
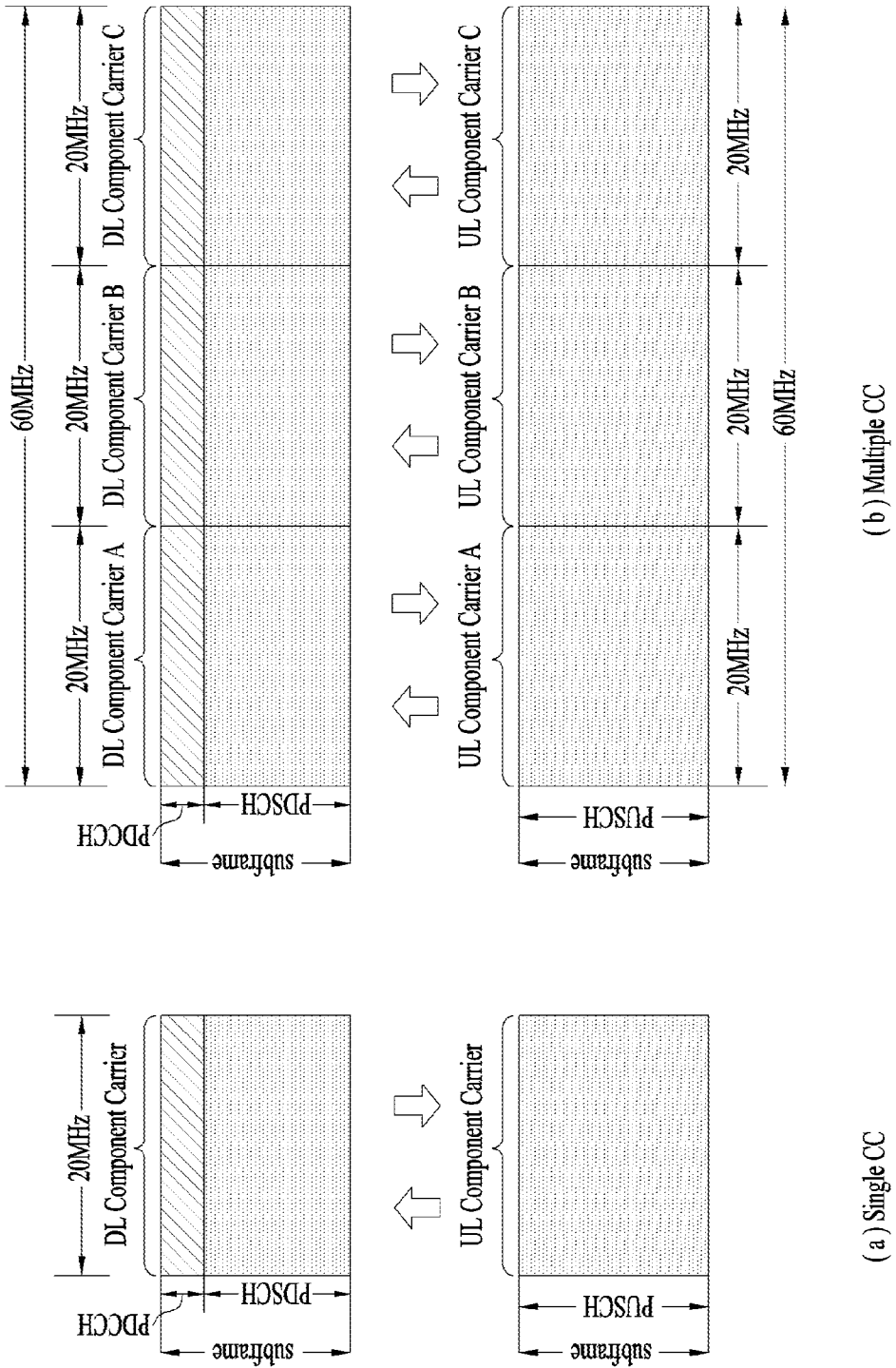
FIG. 6 is a diagram illustrating an example of a component carrier (CC) and carrier aggregation (CA) used in an LTE_A system.

FIG. 6 illustrates an example of CCs and CA in the LTE-A system, which are used in embodiments of the present disclosure.

FIG. 6(a) illustrates a single carrier structure in the LTE system. There are a DL CC and a UL CC and one CC may have a frequency range of 20 MHz.

FIG. 6(b) illustrates a CA structure in the LTE-A system. In the illustrated case of FIG. 6(b), three CCs each having 20 MHz are aggregated. While three DL CCs and three UL CCs are configured, the numbers of DL CCs and UL CCs are not limited. In CA, a UE may monitor three CCs simultaneously, receive a DL signal/DL data in the three CCs, and transmit a UL signal/UL data in the three CCs.

If a specific cell manages N DL CCs, the network may allocate M (M≤N) DL CCs to a UE. The UE may monitor only the M DL CCs and receive a DL signal in the M DL CCs. The network may prioritize L (L≤M≤N) DL CCs and allocate a main DL CC to the UE. In this case, the UE should monitor the L DL CCs. The same thing may apply to UL transmission.

The linkage between the carrier frequencies of DL resources (or DL CCs) and the carrier frequencies of UL resources (or UL CCs) may be indicated by a higher-layer message such as an RRC message or by system information. For example, a set of DL resources and UL resources may be configured based on linkage indicated by System Information Block Type 2 (SIB2). Specifically, DL-UL linkage may refer to a mapping relationship between a DL CC carrying a PDCCH with a UL grant and a UL CC using the UL grant, or a mapping relationship between a DL CC (or a UL CC) carrying HARQ data and a UL CC (or a DL CC) carrying an HARQ ACK/NACK signal.

1.3. Sounding Reference Signal (SRS)

1.3.1 SRS in LTE/LTE-A System

Figure 7:
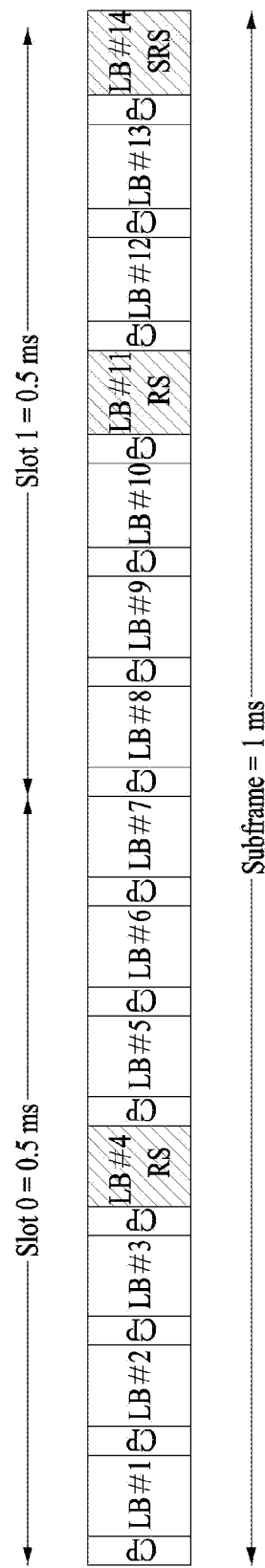
FIG. 7 is a diagram illustrating one of SRS transmission methods used in the embodiments of the present invention.

FIG. 7 illustrates one of methods for transmitting SRS used at embodiments of the present invention.

An SRS is used for channel quality estimation to enable frequency-selective scheduling on uplink. At this time, SRS transmission is performed regardless of uplink data transmission and/or uplink control information transmission. The SRS may be used for the purpose of enhancing power control or supporting various start-up functions for UEs not recently scheduled. For example, the various start-up functions include initial modulation and coding scheme (MCS) selection, initial power control for data transmission, timing advance (TA), and so-called frequency semi-selective scheduling. At this time, frequency semi-selective scheduling means that the frequency resource is assigned selectively for the first slot of a subframe and hops pseudorandomly to a different frequency in the second slot.

In addition, the SRS can be used for downlink channel quality estimation under the assumption that the wireless channel is reciprocal between uplink and downlink. This assumption is especially valid in a time division duplex (TDD) system where the uplink and downlink share the same frequency spectrum and are separated in the time domain.

The subframes in which SRSs are transmitted by any UE within the cell are indicated by cell-specific broadcast signaling. A 4-bit cell-specific 'srsSubframeConfiguration' parameter indicates 15 possible sets of subframes in which an SRS may be transmitted within each radio frame. This configurability provides flexibility in adjusting the SRS overhead depending on deployment scenario. A $16^{th}$ configuration switches the SRS off completely in the cell, which may for example be appropriate for a cell serving primarily high-speed UEs.

The SRS transmissions are always performed in the last SC-FDMA symbol in the configured subframes. Thus, the SRS and DM RS are located in different SC-FDMA symbols. PUSCH data transmission is not permitted on the SC-FDMA symbol designated for SRS, resulting in a worst-case sounding overhead of up to 7% in every subframe.

Each SRS symbol is generated by basis sequences where for a given time instance and bandwidth all the UEs in a cell use the same basis sequence while SRS transmissions from multiple UEs in the same time and band in a cell are distinguished orthogonally by different cyclic shifts of the basis sequence assigned to different UEs. SRS sequences from different cells can be distinguished by assigning different basis sequences in different cells where orthogonality is not guaranteed between different basis sequences.

1.3.2 Method for UE to Transmit Sounding Signal

Hereinafter, a description will be given of methods for a UE to transmit an SRS.

A UE may transmit an SRS on an SRS resource per serving cell based on two trigger types. Trigger type 0 means a periodic SRS transmission method indicated by higher layer signaling and trigger type 1 means a periodic SRS transmission method requested by DCI format 0/4/1A transmitted through PDCCH for FDD and TDD schemes or DCI format 2B/2C/2D transmitted through PDCCH for the TDD scheme.

If both of the SRS transmission according to the trigger type 0 and the SRS transmission according to the trigger type 1 occurs at the same subframe in the same serving cell, the UE performs only the SRS transmission according to the trigger type 1. The user equipment may be assigned SRS parameters for the trigger type 0 and/or trigger type 1 in each serving cell. Hereinafter, a description will be given of the SRS parameters, which are configured serving-cell-specifically or semi-statically for the trigger type 0 and/or trigger type 1 by a higher layer signal.

The transmission comb, $\bar{k}_{TC}$ defined in clause 5.5.3.2 of 3GPP TS 36.211 is configured for the trigger type 0 and each configuration of the trigger type 1, respectively.

The starting physical resource block assignment parameter, $n_{RRC}$ defined in clause 5.5.3.2 of 3GPP TS 36.211 is configured for the trigger type 0 and each configuration of the trigger type 1, respectively.

A duration parameter for the trigger type 0 may be configured for a single subframe. Alternatively, the duration parameter may be indefinitely configured until it is released.

A srs-ConfigIndex $I_{SRS}$ parameter indicating an SRS transmission period, $T_{SRS}$ and an SRS subframe offset, $T_{offset}$ for the trigger type 0 is defined in Table 7 and Table 8 below. A srs-ConfigIndex parameter, $I_{SRS}$ indicating an SRS transmission period, $T_{SRS,1}$ and an SRS subframe offset, $T_{offset,1}$ for the trigger type 1 is defined in Table 10 and Table 11 below.

The SRS bandwidth parameter, $B_{SRS}$ defined in 5.5.3.2 of 3GPP TS 36.211 is configured for the trigger type 0 and each configuration of the trigger type 1, respectively.

The frequency hopping bandwidth parameter, $b_{hop}$ defined in 5.5.3.2 of 3GPP TS 36.211 is configured for the trigger type 0.

The cyclic shift parameter, $n_{SRS}^{cs}$ defined in 3GPP TS 36.211 is configured for the trigger type 0 and each configuration of the trigger type 1.

An antenna port number parameter, $N_p$ is configured for the trigger type 0 and each configuration of the trigger type 1.

For the trigger type 1 and DCI format 4, three sets of SRS parameters (e.g., srs-ConfigApDCI-Format4) is configured by a higher layer signal. 2-bit of an SRS request field contained in the DCI format 4 indicates an SRS parameter set shown in Table 2 below.

TABLE 2

| Value of SRS request filed | Description |
| --- | --- |
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

For the trigger type 1 and DCI format 0, one SRS parameter set, srs-ConfigApCDI-Format0 is configured by higher layer signaling. For the trigger type 1 and DCI format 1A/2B/2C/2D, one common SRS parameter set, srs-ConfigApCDI-Format1a2b2c is configured by higher layer signaling.

If 1 bit of an SRS request field contained in the DCI format 0/1A/2B/2C/2D is set to '1', the trigger type 1 can be triggered (i.e., positive SRS request). If the UE is assigned the SRS parameters for the DCI format 0/1A/2B/2C/2D through higher layer signaling, 1 bit of the SRS request field is included in the DCI format 0/1A with respect to frame structure type 1 and 1 bit of the SRS request field is included in the DCI format 0/1A/2B/2C/2D with respect to the frame structure type 2.

A serving-cell-specific SRS transmission band $C_{SRS}$ and serving-cell-specific SRS transmission subframes are configured by higher layer signaling (e.g., MAC message, RRC message, etc.).

If a UE supporting transmit antenna selection is allowed (or activated) to select an antenna in a given serving cell, an index of the UE antenna for transmitting SRS during a time $n_{SRS}$ is determined according to Equation 1 or Equation 2.

$$a(n_{SRS}) = n_{SRS} \bmod 2 \qquad \text{[Equation 1]}$$

Equation 1 shows a UE antenna index in case that frequency hopping is deactivated in some or all of a sounding bandwidth (i.e., $b_{hop} \geq B_{SRS}$).

$$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases}, \beta = \begin{cases} 1 & \text{where } K \bmod 4 = 0 \\ 0 & \text{otherwise} \end{cases} \qquad \text{[Equation 2]}$$

Equation 2 shows a UE antenna index in case that frequency hopping is activated (i.e., $b_{hop} < B_{SRS}$). The parameter values $B_{SRS}$, $b_{hop}$, $N_b$, and $n_{SRS}$ of Equation 1 and Equation 2, which are incorporated herein by reference, can be found in clause 5.5.3.2 of 3GPP TS 36.211. Except for the case where single SRS transmission is assigned to the UE, K is set to $$K = \prod_{b'=b_{hop}}^{B_{SRS}} N_{b'}.$$

In this case, it is assumed that $$N_{b_{hop}} = 1$$

regardless of a value of $N_b$. If the UE is connected to at one or more serving cells, the UE is not expected to transmit SRS on different antenna ports simultaneously.

The UE may be configured to transmit SRS on $N_p$ antenna ports of a serving cell where $N_p$ may be informed the UE through a higher layer signal. In case of PUSCH transmission mode 1, $N_p$ is set to $N_p \in \{0,1,2,4\}$. In case of PUSCH transmission mode 2 with two antenna ports configured for PUSCH, $N_p$ is set to $N_p \in \{0,1,2\}$. In case of four antenna ports configured for PUSCH, $N_p$ is set to $N_p \in \{0,1,4\}$.

In case of a UE configured to transmit SRS on multiple antenna ports of the serving cell, the UE should transmit SRS for all the configured transmit antenna ports within one SC-FDMA symbol of the same subframe of the corresponding serving cell. The SRS transmission bandwidth and starting physical resource block assignment parameters are the same for all the configured antenna ports of the corresponding serving cell.

In case of a UE not configured with multiple TAGs (timing advanced group), the UE does not transmit SRS whenever SRS transmission and PUSCH transmission overlap each other in the same symbol. Here, TAG means a group of serving cells with the same TA, which is used for matching uplink synchronization with an eNB in a carrier aggregation (CA) environment.

In the case of TDD, if there is one SC-FDMA symbol in UpPTS of a given serving cell, the SC-FDMA symbol can be used for SRS transmission. If there are two SC-FDMA symbols in UpPTS of a given serving cell, the two SC-FDMA symbols may be assigned to the same UE and both of them can be used for SRS transmission.

When trigger type 0 SRS transmission and PUCCH format 2/2a/2b transmission collide with each other in the same subframe, the UE not configured with the multiple TAGs does not perform the trigger type 0 SRS transmission. When trigger type 1 SRS transmission and PUCCH format 2a/2b transmission or PUCCH format 2 transmission for HARQ information transmission collide with each other in the same subframe, the UE not configured with the multiple TAGs does not perform the trigger type 1 SRS transmission. When PUCCH format 2 transmission of which the purpose is not to transmit HARQ information and the trigger type 1 SRS transmission collide with each other in the same subframe, the UE not configured with the multiple TAGs does not perform the PUCCH format 2 transmission.

In case that an ackNackSRS-SimultaneousTransmission parameter is set to 'FALSE', if SRS transmission, PUCCH transmission for HARQ-ACK information transmission, and/or positive SR collide with each other in the same subframe, the UE not configured with the multiple TAGs does not perform the SRS transmission. In case that the ackNackSRS-SimultaneousTransmission parameter is set to 'TRUE', if the SRS transmission, the PUCCH transmission for the HARQ-ACK information transmission, and/or a shortened format of positive SR collide with each other in the same subframe, the UE not configured with the multiple TAGs performs the SRS transmission.

If the SRS transmission, PUCCH transmission for the HARQ information transmission, and/or a common PUCCH format of positive SR collide with each other in the same subframe, the UE not configured with the multiple TAGs does not perform the SRS transmission.

If an interval for the SRS transmission overlaps with a PRACH region for preamble format 4 in UpPTS or the interval exceeds the range of an uplink system bandwidth configured in the serving cell, the UE does not perform the SRS transmission.

Whether the UE simultaneously transmits PUCCH carrying HARQ-ACK information and SRS in the same subframe is determined based on the ackNackSRS-SimultaneousTransmission parameter provided by a higher layer. If the UE is configured to transmit the PUCCH carrying the HARQ-ACK information and the SRS in the same subframe, the UE transmits the HARQ-ACK and SR in cell-specific SRS subframes of a primary cell by using a shortened PUCCH format. In this case, the HARQ-ACK or an SR symbol corresponding to a location of the SRS is punctured. Even if the UE does not transmit SRS in a cell-specific SRS subframe of the primary cell, the shortened PUCCH format is used in the corresponding subframe. Otherwise, the UE uses common PUCCH format 1/1a/1b or common PUCCH format 3 in order to transmit the HARQ-ACK and SR.

Table 3 and Table 4 show trigger type 0 of an SRS configuration with respect to an SRS transmission periodicity parameter, $T_{SRS}$ and an SRS subframe offset parameter, $T_{offset}$ defined in FDD and TDD, respectively.

TABLE 3

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 4

| SRS Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

The SRS transmission periodicity parameter $T_{SRS}$ is a serving-cell-specific value and is selected from a set of {2, 5, 10, 20, 40, 80, 160, 320} ms or subframes. In case of the periodicity parameter $T_{SRS}$ set to 2 ms in the TDD, two SRS resources are configured in a half frame including UL subframes in a given serving cell.

In case of $T_{SRS}>2$ in the TDD or FDD, the trigger type 0 of SRS transmission instances are determined as subframes satisfying the condition of $(10 \cdot n_f + k_{SRS} - T_{offset}) \mod T_{SRS} = 0$ in a given serving cell. Here, in the case of FDD, $k_{SRS}=\{0, 1, \ldots, 9\}$ means an index of a subframe in a frame and in the case of TDD, $k_{SRS}$ is defined as shown in Table 5 below. Moreover, in case of $T_{SRS}=2$ in TDD, SRS transmission instances are determined as subframe satisfying the condition of $(k_{SRS} - T_{offset}) \mod 5 = 0$.

In case of a UE configured with type 1 SRS transmission in serving cell c and configured with a carrier indicator field, if the UE detects a positive SRS request from PDCCH/EPDCCH for scheduling PUSCH/PDSCH, the UE transmits SRS in serving cell c corresponding to the carrier indicator filed.

If a UE configured with type 1 SRS transmission in serving cell c detects a positive SRS request from subframe n of serving cell c, in case of $T_{SRS,1}=2$ in TDD, the UE

TABLE 5

| | subframe index n | | | | | | | | | |
|---|---|---|---|---|---|---|---|---|---|---|
| | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

Table 6 and Table 7 show SRS transmission periodicity, $T_{SRS,1}$ and SRS subframe offset, $T_{offset,1}$ defined in FDD and TDD, respectively, in the case of trigger type 1 of SRS transmission.

TABLE 6

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-31 | reserved | reserved |

TABLE 7

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}-10$ |
| 15-24 | 10 | $I_{SRS}-15$ |
| 25-31 | reserved | reserved |

The periodicity parameter for SRS transmission, $T_{SRS,1}$ is a serving-cell-specific value and is selected from a set of {2, 5, 10} ms or subframes. In case that the SRS transmission periodicity is set to 2 ms in the TDD, two SRS resources are configured in a half frame including UL subframes in a given serving cell.

In case of a UE configured with type 1 SRS transmission in serving cell c and not configured with a carrier indicator filed, if the UE detects a positive SRS request from PDCCH/EPDCCH for scheduling PUSCH/PDSCH, the UE transmits SRS in serving cell c.

initiates SRS transmission in a first subframe satisfying the conditions of $n+k, k \geq 4$ and $(10 \cdot n_f + k_{SRS} - T_{offset,1}) \mod T_{SRS,1} = 0$. Alternatively, in case of $T_{SRS,1}=2$ in TDD, the UE initiates SRS transmission in a first subframe satisfying the condition of $(k_{SRS} - T_{offset,1}) \mod 5 = 0$. Here, in the case of FDD, $k_{SRS}=\{0, 1, \ldots, 9\}$ means a subframe index of frame $n_f$.

A UE configured with trigger type 1 SRS transmission is not expected to receive a type 1 SRS triggering event related to trigger type 1 SRS transmission parameters, which are configured with different values with respect to the same serving cell and the same subframe by higher layer signaling.

If SRS transmission collides with retransmission of the same transport block or PUSCH transmission corresponding to a random access response as part of a contention-based random access procedure, a UE does not transmit SRS.

1.3.3 Periodic SRS Transmission and Aperiodic SRS Transmission

Figure 8:
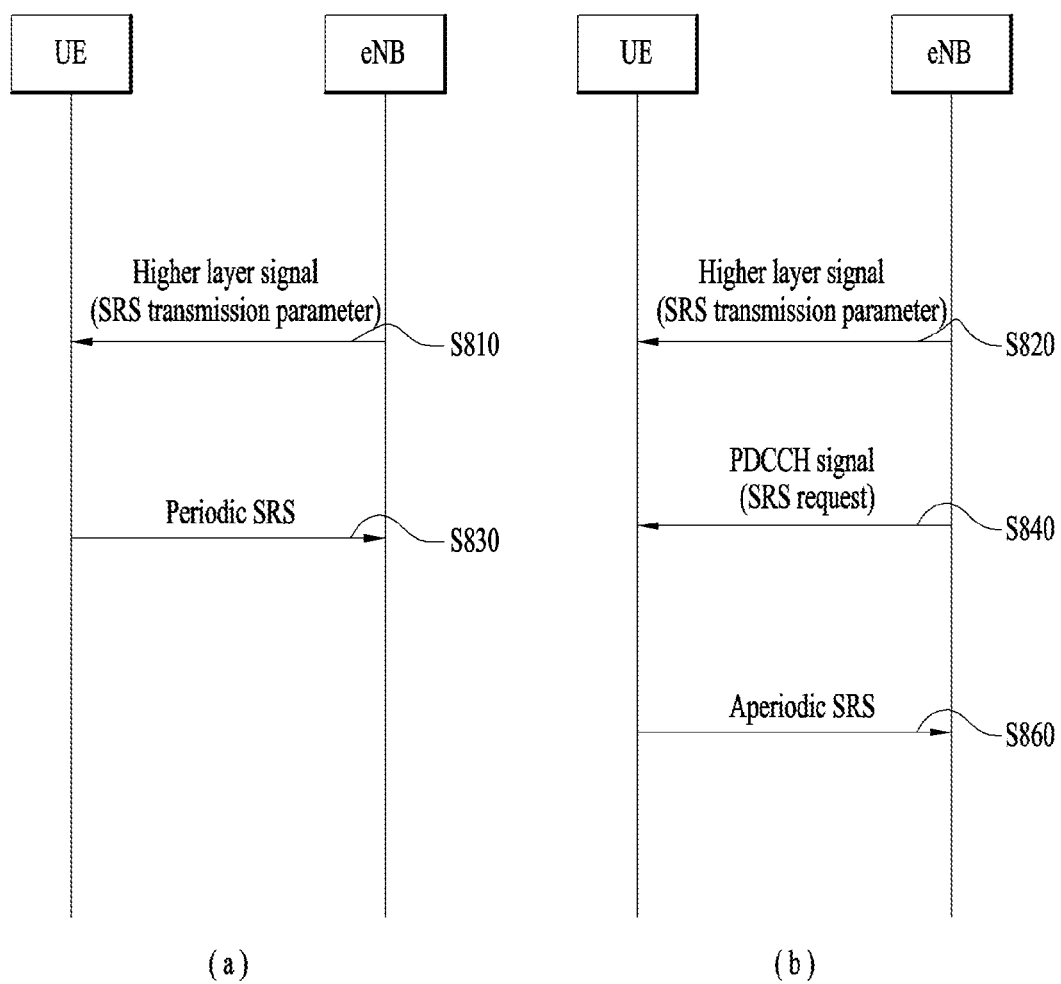
FIG. 8 is a diagram illustrating a concept of periodic SRS transmission and a concept of aperiodic SRS transmission.

FIG. 8(a) is a diagram showing the concept of periodic SRS transmission and FIG. 8(b) is a diagram showing the concept of aperiodic SRS transmission.

First, periodic SRS transmission will be described. Referring to FIG. 8(a), SRS transmission parameters for SRS transmission are transmitted from an eNB to a UE via a higher layer signal (e.g., an RRC signal) (S810).

The SRS transmission parameters may include an SRS transmission bandwidth parameter indicating bandwidth occupied by one SRS transmission, a hopping bandwidth parameter indicating a frequency region in which SRS transmission hops to a frequency, a frequency position parameter indicating a position where SRS transmission starts in the frequency region, a transmission comb parameter indicating an SRS transmission position or pattern, a cyclic shift parameter for distinguishing between SRSs, a period parameter indicating an SRS transmission period and a subframe offset parameter indicating a subframe in which an SRS is transmitted. At this time, the subframe offset parameter may indicate a cell-specific SRS subframe or a UE-specific SRS subframe.

The UE may periodically perform SRS transmission at a time interval of 2 ms to 160 ms based on the SRS transmission parameters (S830).

At this time, since SRS symbols cannot be used for PUSCH transmission, all UEs within the cell may previously know in which subframe SRS transmission is performed in the cell.

Next, aperiodic SRS transmission will be described. Aperiodic SRS transmission is triggered through signaling on a PDCCH as part of scheduling grant. The frequency region structure of aperiodic SRS transmission is equal to that of periodic SRS transmission. However, when an aperiodic SRS is transmitted is determined per UE via higher layer signaling.

Referring to FIG. 8(b), SRS transmission parameters for SRS transmission are transmitted from an eNB to a UE via a higher layer signal (e.g., an RRC signal) (S820).

At this time, the SRS transmission parameters used for aperiodic SRS transmission are basically equal to those used for periodic SRS transmission.

The eNB transmits a PDCCH signal or an E-PDCCH signal having an SRS request field to the UE when aperiodic SRS transmission is requested. At this time, the E-PDCCH signal means control information transmitted via a PDSCH region. In addition, for the description of the PDCCH signal, refer to Chapter 1 (S840).

The UE, which has explicitly received the request for aperiodic SRS transmission in step S1140, may perform aperiodic SRS transmission in the subframe (S860).

2. Millimeter Wave (mmWave)

2.1 Characteristics of LoS (Line of Sight) and NLoS (Non Line of Sight)

An mmWave signal is significantly sensitive to shadowing. For instance, in the case of the mmWave signal, 40 dB to 80 dB of signal attenuation may occur due to obstacles such as a wall and the like. Moreover, a human body may easily cause 20 dB to 35 dB of signal attenuation. In this case, the obstacles including the human body may cause a propagation delay, which significantly affects transmission of the mmWave signal.

Figure 9:
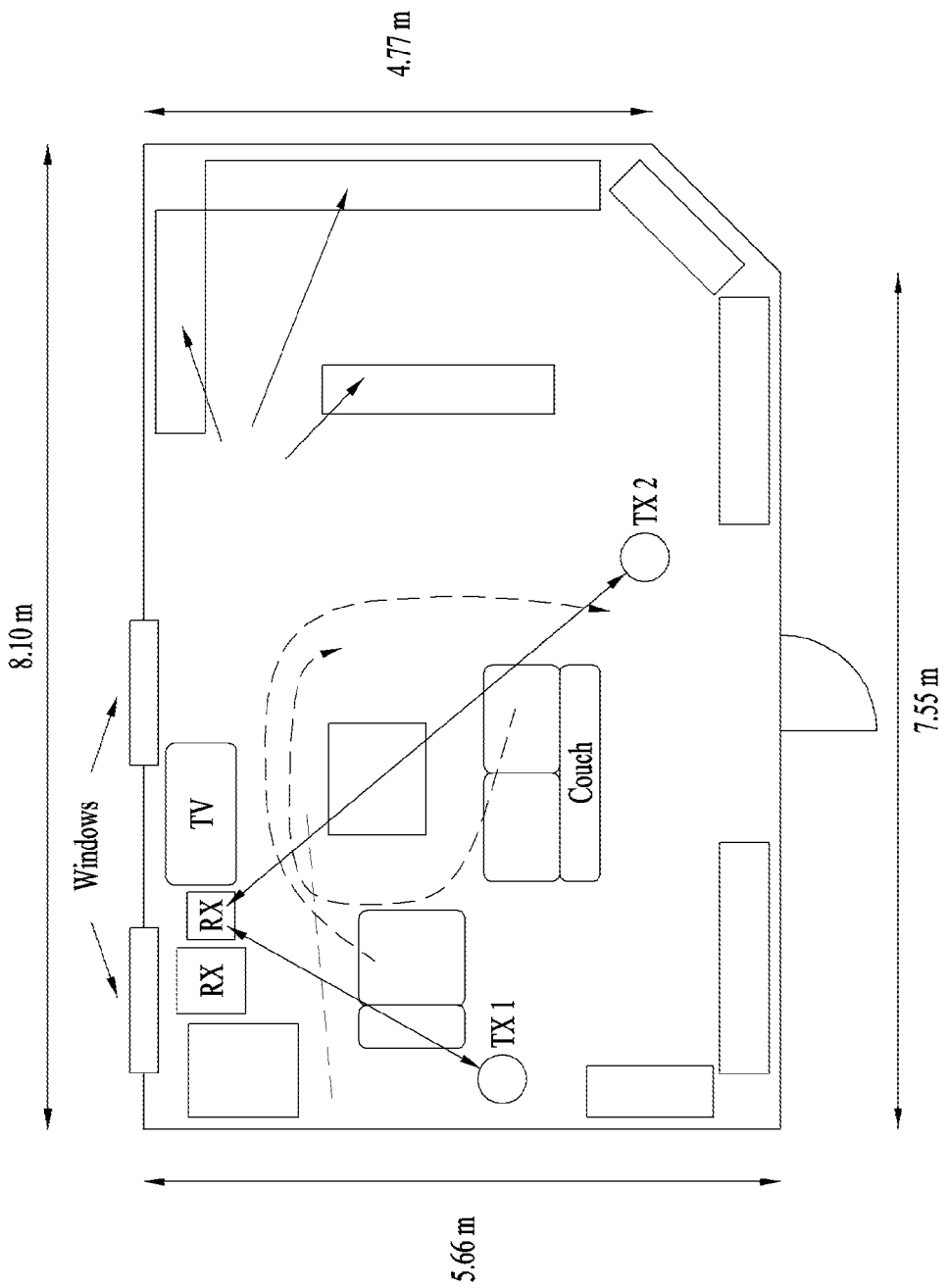
FIG. 9 is a diagram illustrating a case in which an mmWave signal is transmitted indoors.

FIG. 9 is a diagram illustrating a case in which an mmWave signal is transmitted indoors and FIG. 10 is a diagram illustrating a case in which an mmWave signal is attenuated by a human body.

It is assumed that a normal person runs at a speed of about 14.4 km/h and walks at a speed of about 4.8 km/h, and a sprinter runs at an average speed of about 10 m/s. If a propagation attenuation of the mmWave signal in the indoor environment shown in FIG. 9 is measured based on the assumption, the result shown in FIG. 10 can be obtained. The following measurement parameters are used to measure the propagation attenuation of the mmWave signal.

(1) Agilent E8361A vector network analyzer
(2) Vertical polarized circular horn antennas: 20 dBi
(3) Half beamwidth: 10 degree FIG. 10(a) shows a result of measuring the mmWave signal in a LoS environment without any obstacles and FIG. 10(b) shows a result of measuring the mmWave signal in an NLoS environment in which the propagation attenuation due to the human body exists. Referring to FIG. 10, a difference between the LoS/NLoS environments amounts to about 15 dB within a distance of 5 m. In the case of 28 GHz band, a power loss difference between the LoS/NLoS amounts to about 43 dB within a distance of 100 m.

Referring to FIGS. 9 and 10, a transition time from the LoS to the NLoS (LoS/NLoS) caused by a person moving at a speed of 0.6 m/s is about 150 ms. Thus, change in the LoS/NLoS transition time due to an object moving at a speed of 10 m/s can be represented as about $$\frac{0.6 \times 0.15}{10} = 9 \text{ ms.}$$

Such transition time change could be shorter if the person suddenly swings a hand or in other particular cases. That is, since such a transition time interval in the LoS/NLoS environment is caused by movement of a user equipment and change in an environment, it is extremely difficult to expect LoS/NLoS change.

Figure 11:
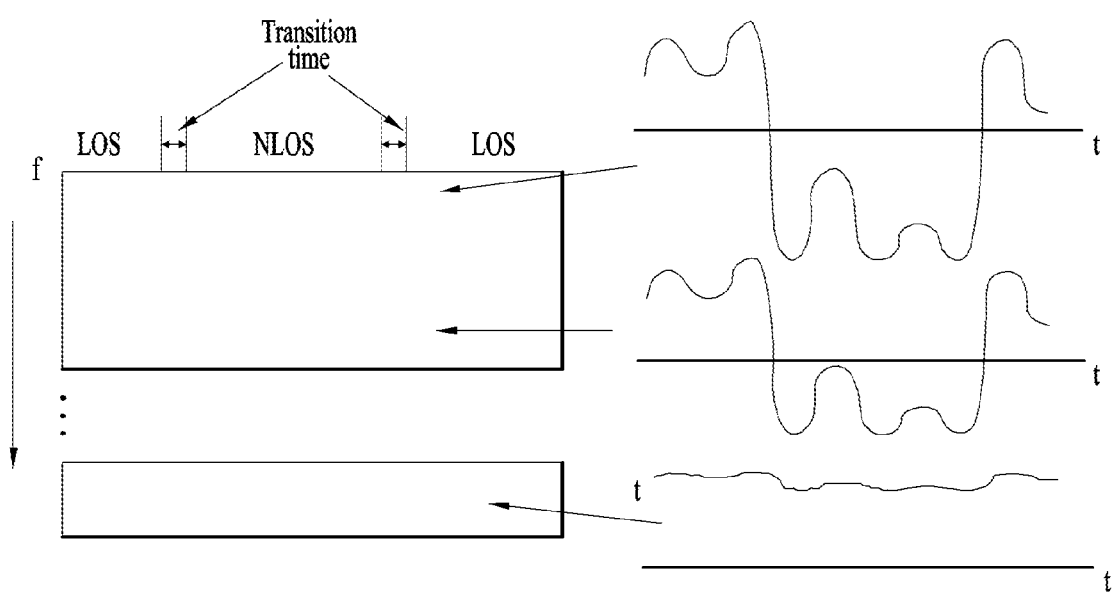
FIG. 11 is a diagram illustrating a relation between a LoS/NLoS transition time and a reception power depending on frequency.

FIG. 11 is a diagram illustrating a relation between a LoS/NLoS transition time and a reception power depending on frequency. In FIG. 11, the horizontal axis indicates a time domain and the vertical axis indicates a frequency domain.

Referring to FIG. 11, the transition time from the LoS and the NLoS is significantly changed in a high frequency environment whereas the rate of change is decreased in a low frequency environment. However, a power difference between the LoS/NLoS may be decreased in the low frequency environment.

As shown in FIG. 11, when the state is transitioned from the LoS to the NLoS or from the NLoS to the LoS, power attenuation or increased time may depend on how the state is changed from the LoS to the NLoS. When the LoS/NLoS transition is performed, attenuation of a reception signal is increased in the high frequency domain whereas in the low frequency domain, the attenuation is small or does not occur. However, an instantaneous power reduction slope at a certain time t is similar in adjacent bands.

As described above, the mmWave system is highly likely to operate in ultra-high frequency bands. That is, the LoS/NLoS transition in the mmWave signal is extremely sensitive to change in an external environment.

Figure 12:
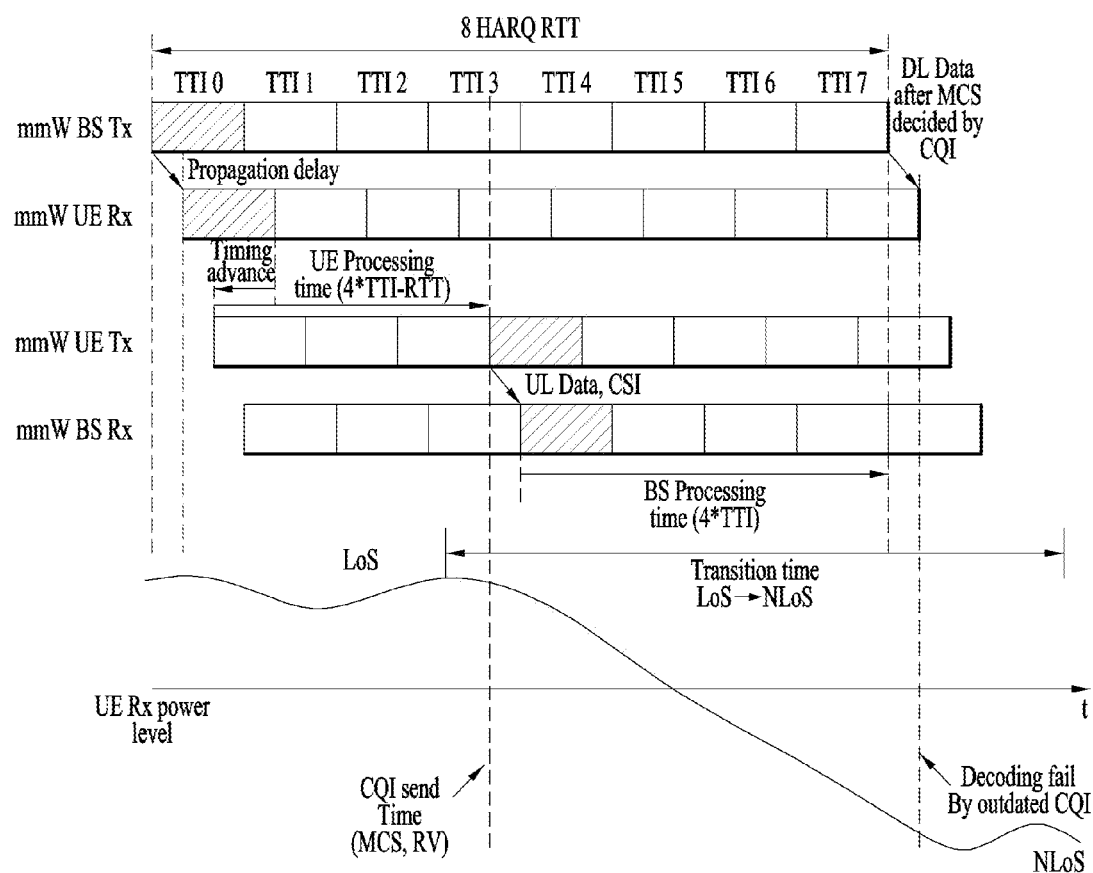
FIG. 12 is a diagram illustrating failure in signal detection due to mmWave downlink reception signal change when the signal detection is performed based on conventional CQI feedback.

FIG. 12 is a diagram illustrating failure in signal detection due to mmWave downlink reception signal change when the signal detection is performed based on conventional CQI feedback.

FIG. 12 shows processes for decoding channel information obtained from a CQI through an 8 HARQ procedure and determining information such as a DCI format, an MCS (modulation and coding scheme), an RV (redundancy version), etc. based on the decoded channel information. In FIG. 12, it is shown that the CQI is outdated if the transition time from the LoS to the NLoS occurs in an mmWave link.

In case that a downlink transmission start time is assumed to be about 4 TTI (4 ms in the LTE), if the LoS/NLoS transition occurs, the most recently detected CQI information of the legacy system is highly likely to have inaccurate information on the transition from the LoS to the NLoS due to the mmWave characteristics. As a result, a base station may transmit inaccurate scheduling information including the MCS and RV to a user equipment and thus the user equipment is highly likely to fail to detect a signal. Consequently, it may cause throughput performance degradation of the system.

As the simplest method for handling channel variation in mmWave downlink, a UE may be configured to transmit the CQI feedback more frequently. The smallest CQI-reporting period of the FDD-based LTE system is composed of two subframes. However, in terms of cost efficiency, decoding of the CQI received at the base station may work as the burden (because a rapid processing time is required). Moreover, if the LoS/NLoS transition occurs while the base station receives and decodes new CQI feedback, even the received new CQI is outdated. Furthermore, since the CQI is an indicator for feeding information based on SINR (signal-tonoise-plus-interference ratio) back, the CQI received at the base station includes information on interference to a received signal as well.

Thus, to identify the LoS/NLoS transition, the user equipment and/or base station are preferred to determine it according to measurement based on a reception power at the corresponding time. As a method of transmitting channel information based on the reception power, a user equipment may measure an RSRP of a downlink reference signal and then report (provide) feedback of the measured RSRP. However, the RSRP is generally suitable for channel measurement performed during a long term because a maximum acceptable time required for the UE to measure the RSRP is 200 ms. In addition, 200 ms is too long from the perspective of the mmWave system. That is, considering that the LoS/NLoS transition needs to be determined based on channel measurement performed during a short term, it is difficult to detect the LoS/NLoS transition and adjust a resultant MCS by using the conventional channel state reporting method.

Hereinafter, methods for configuring a new reference signal for enabling a base station to rapidly detect a transition from LoS to NLoS will be described. In addition, according to the present invention, the base station can adjust such a reference signal and a recently received CQI based on the current channel state. Moreover, by maintaining the conventional CQI reporting period, the backward compatibility with the legacy system can be guaranteed and the serious channel transition in the mmWave system can be overcame. Details of relevant methods will also be described.

3. New Reference Signal 3.1 LoS/NLoS Measurement Method and MCS Adjustment Method The embodiments of the present invention propose methods of configuring new uplink reference signals used in user equipments and methods of transmitting data using the new reference signals in order to enable a base station to cope with instantaneous downlink channel variation when downlink of an mmWave system is rapidly changed from a LoS state to an NLoS state.

The LTE/LTE-A system uses an SRS (sounding reference signal) for link adaptation in uplink. Specifically, a base station measures channel information based on the SRS and then provides uplink control information estimated based on the measured channel information to a user equipment.

Unlike the above SRS, the new uplink reference signal proposed in the embodiments of the present invention means a reference signal for enabling the base station to rapidly anticipate and cope with channel variation caused by a rapid transition from the LoS to the NLoS or vice versa. In the embodiments of the present invention, the above new uplink reference signal is defined as an mW-RS (mmWave reference signal). In addition, considering that such an mW-RS is used by the base station to adjust CQI information for channel state estimation, the mW-RS can also be referred to as a CQI assistant RS.

The base station may measure channel information based on an mmWave UL-RS, adjust scheduling information (e.g., MCS, RV, etc.) on a downlink channel based on the measured channel information and the most recently obtained CQI information, and then transmit the adjusted scheduling information to the user equipment.

Figure 13:
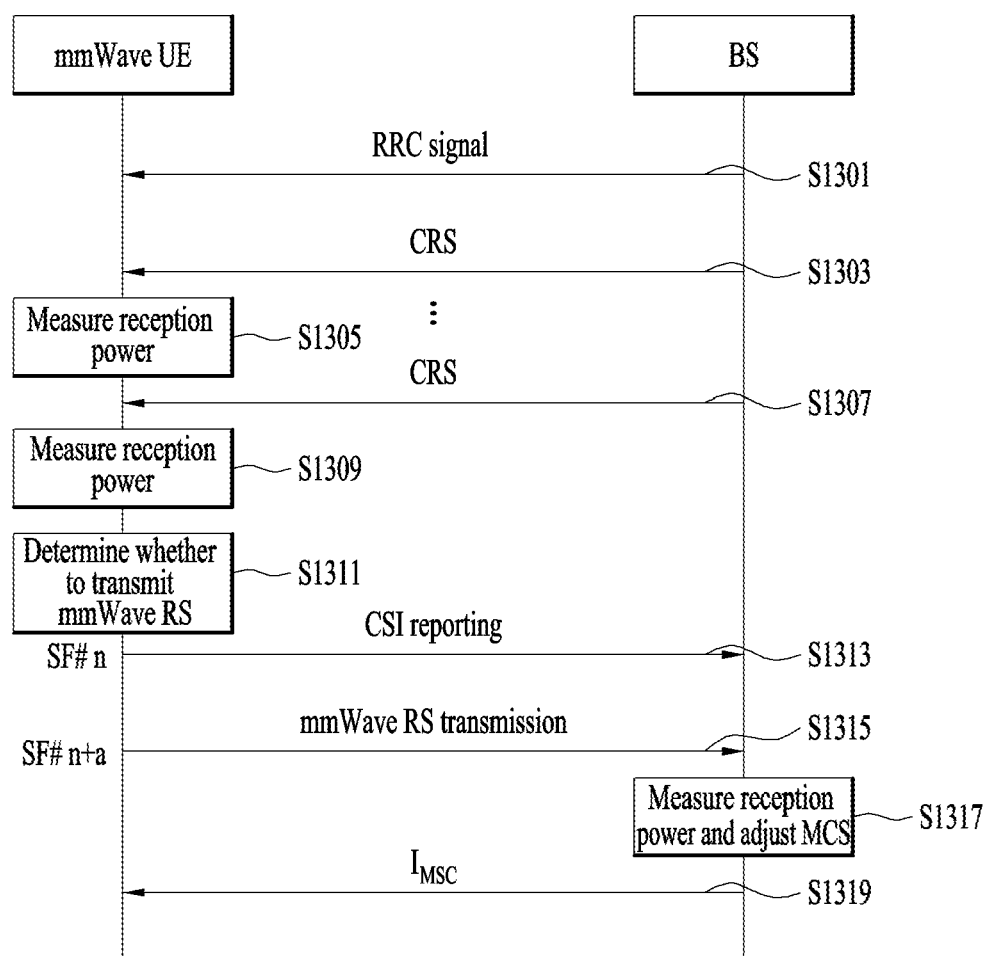
FIG. 13 is a diagram for explaining a method for a base station to measure a reception power and adjust scheduling information based on a new mW-RS when a LoS/NLoS transition occurs.

FIG. 13 is a diagram for explaining a method for a base station to measure a reception power and adjust scheduling information based on a new mW-RS when a LoS/NLoS transition occurs.

The mW-RS transmission proposed in the embodiments of the present invention may be triggered by the user equipment autonomously or trigged by the base station. Here, an mmWave user equipment means a user equipment supporting an mmWave operation. Unless specified otherwise, the user equipment in the following description means the mmWave user equipment.

Referring to FIG. 13, the base station may transmit, to the user equipment, a higher layer signal (e.g., RRC signal) containing mW-RS configuration information necessary for configuring the mW-RS and/or information on a time interval in which the mW-RS is transmitted [S1301].

The base station may transmit a downlink reference signal to the user equipment and the user equipment may measure a reception power based on the downlink reference signal. In this case, a CRS (cell-specific RS) can be taken as an example of the downlink reference signal. The CRS is transmitted through 1 OFDM symbol in each slot of a subframe [S1303, S1305, S1307, and S1309].

After measuring the reception power based on the CRSs received in predetermined time intervals, the user equipment may determine whether to transmit the mW-RS. For instance, the user equipment may measure the reception power based on the CRS received in each slot or the CRSs received on a basis of the subframe. Therefore, the user equipment may check whether the LoS/NLoS transition occurs by comparing magnitudes of the measured reception powers and then determine whether to transmit the mW-RS [S1311].

However, since the LoS/NLoS transition randomly and quickly occurs in the mmWave environment, it is preferred to set the length of a time interval for measuring and comparing the reception powers to be relatively short.

If a difference between the reception powers measured in the steps S1305 to S1309 is not quite large, the user equipment may determine that there has been no LoS/NLoS transition in the step S1311. In this case, the user equipment may report CSI containing a CQI with respect to the corresponding channel to the base station according to a predetermined period or a request from the legacy system. At this time, the user equipment does not transmit the mW-RS.

However, if the difference between the reception powers measured in the steps S1305 to S1309 is quite large, the user equipment may determine that the LoS/NLoS transition has been occurred. In this case, the user equipment may determine the mW-RS transmission in the step S1311.

The user equipment reports the CSI to the base station in the step S1313. In the embodiments of the present invention, the CSI can be transmitted either periodically or aperiodically.

In addition, since the user equipment recognizes that the LoS-NLoS transition has been occurred in the step S1311, the user equipment may generate and transmit the mW-RS [S1315].

The base station may check the current channel state with the user equipment by measuring a reception power based on the received mW-RS. In this case, it is assumed that an uplink channel is similar to a downlink channel. In addition, in the step S1313, the base station may obtain the CQI corresponding to long term channel information on the corresponding channel by receiving the CSI either periodically or aperiodically. Moreover, the base station may know the current channel state based on the reception power measured based on the mW-RS received in the step S1315. Thus, the base station may not only select an MCS based on the CQI but also adjust the selected MCS based on the reception power measured in the step S1315 [S1317].

That is, in the step S1317, the base station may determine the MCS, which will be applied to data to be transmitted later, according to the reception power measured based on the recently received CQI information and mW-RS. Thereafter, the base station may transmit, to the user equipment, an MCS index ($I_{MCS}$) for indicating the MCS adjusted according to the LoS-NLoS transition [S1319].

3.2 mW-RS Assignment Location

Figure 14:
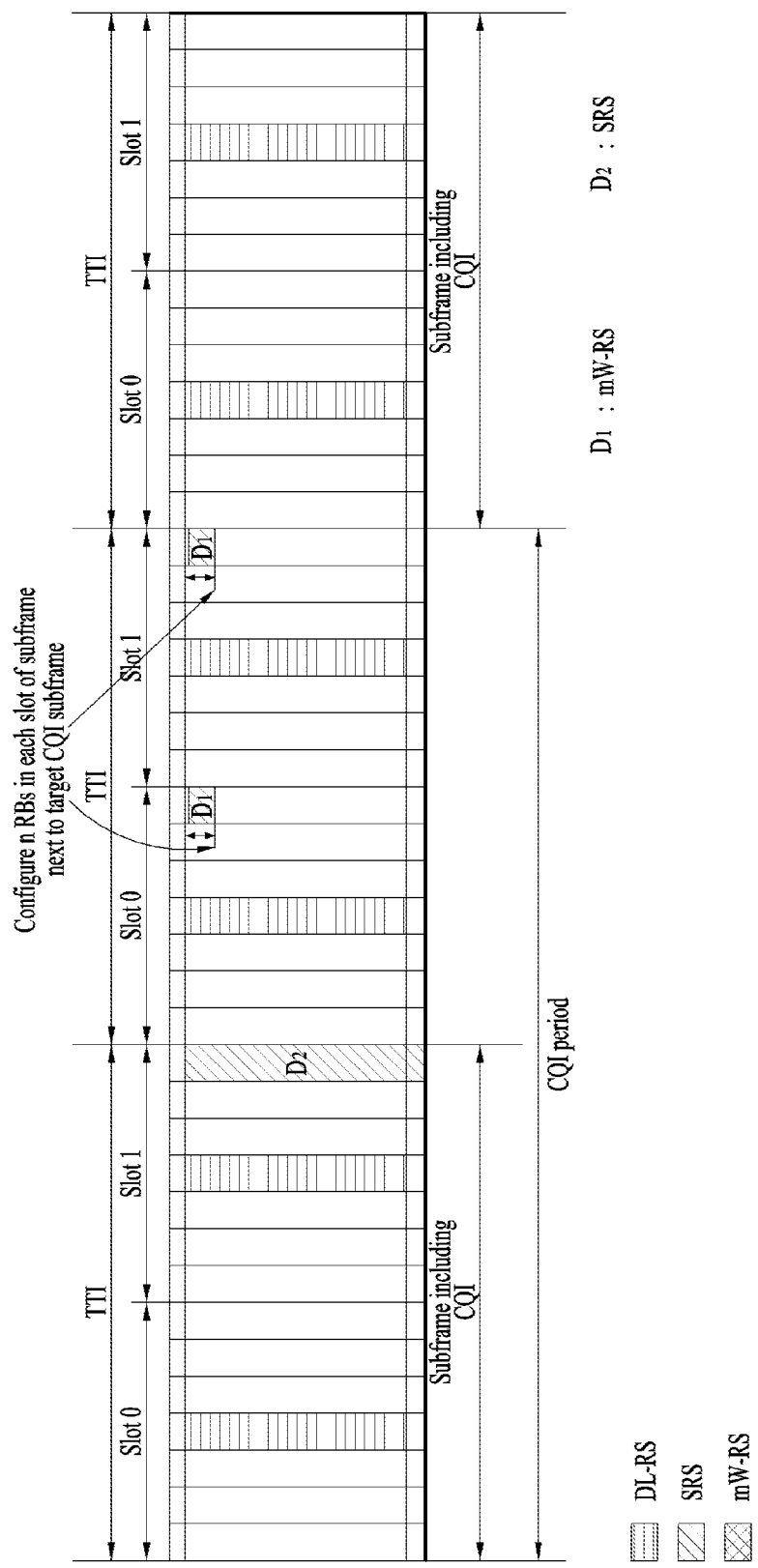
FIG. 14 is a diagram illustrating examples of locations to which a DL-RS, an SRS, and an mW-RS are assigned.

FIG. 14 is a diagram illustrating examples of locations to which a DL-RS, an SRS, and an mW-RS are assigned.

Basically, the frame structure of the LTE system, which is described with reference to FIG. 2 (a), is assumed in FIG. 14. That is, it is assumed that two slots are included in one subframe of 1 ms and 7 OFDM symbols are included in each slot. In addition, it is also assumed that a CQI is reported with a period of two subframes.

Referring to FIG. 14, a DL-RS (e.g., CRS, DM-RS, CSI-RS, etc.) is transmitted through a single OFDM symbol in each slot of each subframe. In addition, an SRS may be transmitted as described in FIG. 7. In this case, the mW-RS proposed in the present invention may be transmitted in the last OFDM symbol of each slot of a subframe next to the subframe in which the CQI is transmitted. The mW-RS may be configured with n RBs.

The method described in FIG. 13 can be applied to the subframe structure of FIG. 14. For instance, if a subframe (SF) used for reporting the CSI in the step S1313 is SF #n, the mW-RS may be configured to be transmitted in SF #(n+1). In addition, the mW-RS may be transmitted predetermined times at regular intervals.

Figure 15:
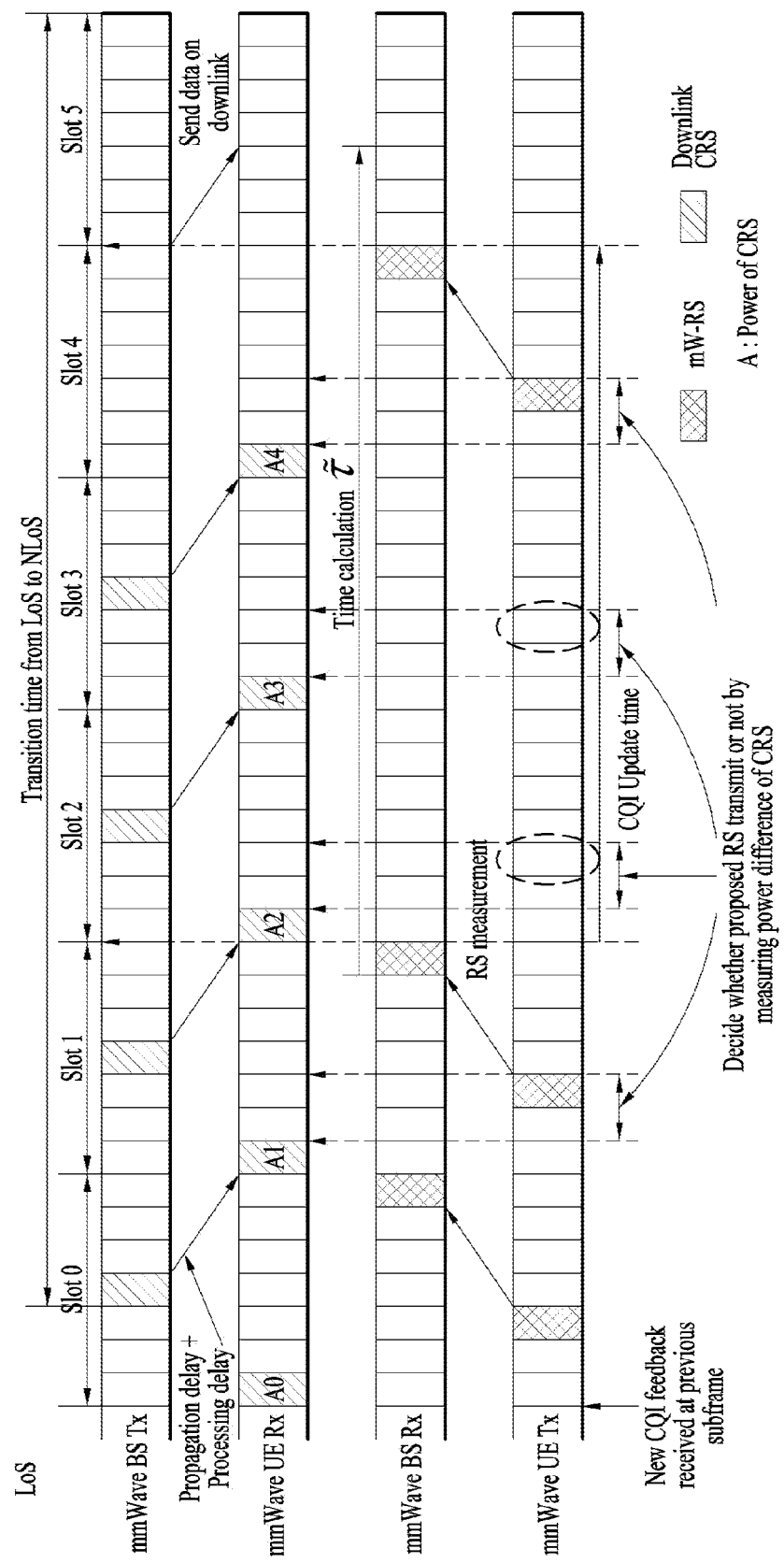
FIG. 15 is a diagram illustrating a method of transmitting an mW-RS in a time domain.

FIG. 15 is a diagram illustrating a method of transmitting an mW-RS in a time domain.

Referring to FIG. 15, a subframe basic structure is similar to that of FIG. 14. However, in FIG. 15, an identification number is assigned to each slot for convenience of description. FIG. 15 illustrates an example of applying the method described in FIG. 13 to time slots. FIG. 15 assumes a case in which the LoS/NLoS transition occurs from a fourth OFDM symbol of slot 0.

A user equipment measures reception power A1 based on a CRS transmitted in the slot 0 and reception power A2 based on a CRS transmitted in slot 1. Similarly, the user equipment may measure reception powers A3, A4, and A0. That is, based on the measured reception powers, the user equipment may determine whether to transmit the mW-RS.

In another aspect of the present embodiment, the A0, A1, and A2 are assumed to be reception powers of downlink reference signals appearing after transmission of two mW-RSs. When a difference between the reception powers A0 and A1 (A0-A1) is not similar to a difference between the reception powers A1 and A2 (A1-A2) or a difference between the reception powers A0 and A2 (A0-A2), the user equipment recognizes that the transition from the LoS to the NLoS or from the NLoS to the LoS occurs in a downlink channel. Thereafter, the user equipment may transmit the proposed reference signal in uplink. If a difference between reception powers is similar to one another, the user equipment does not transmit the mW-RS in uplink.

More details of FIG. 15 can be found in the description of the steps S1303 to S1315.

3.3 mW-RS Transmission Interval

Figure 16:
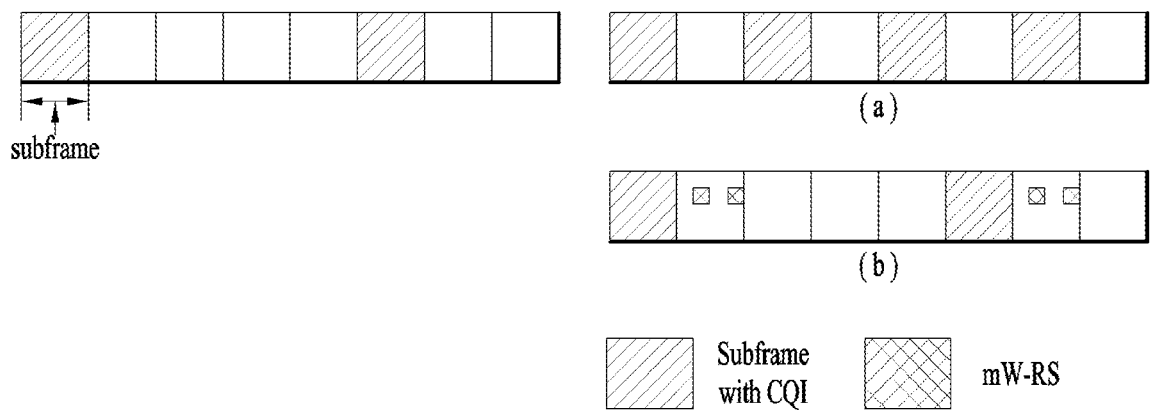
FIG. 16 is a diagram for explaining a transmission location of an mW-RS.
Figure 17:
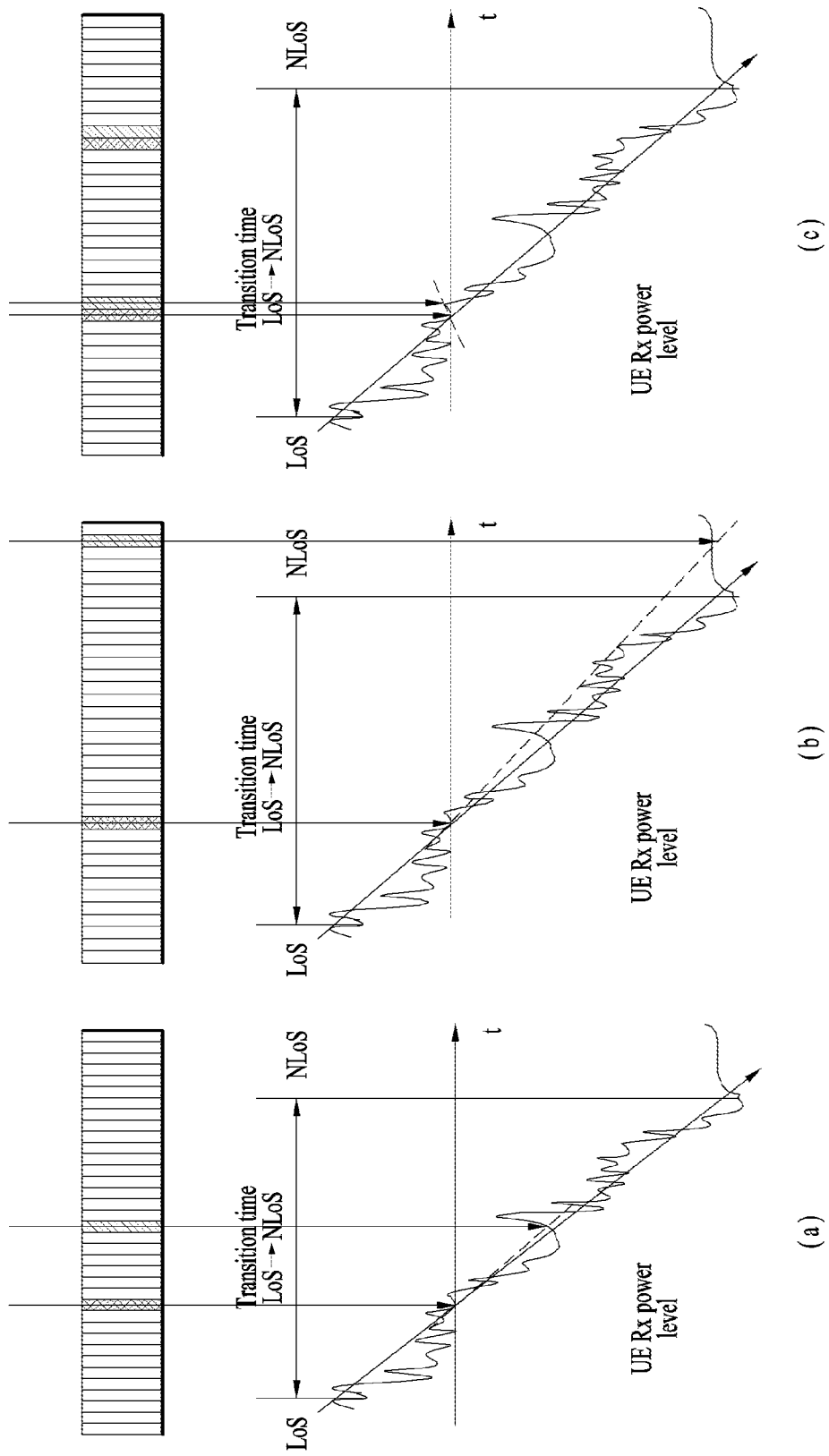
FIG. 17 is a diagram for explaining a transmission interval of an mW-RS.

FIG. 16 is a diagram for explaining a transmission location of an mW-RS and FIG. 17 is a diagram for explaining a transmission interval of an mW-RS.

FIG. 16 describes a CQI transmission period on a subframe basis. For example, a CQI reporting is composed of 5 subframe in the related art. FIG. 16(a) shows a method of reducing the CQI period to detect the LoS/NLoS transition in the mmWave system. However, a method of using a short CQI period to cope with channel variation in mmWave downlink has disadvantages in that a base station can hardly anticipate channel variation occurring while processing CQI feedback. Moreover, the method is not regarded as a good method in terms of uplink overhead.

Moreover, the reason for why the mW-RS is not assigned to the subframe in which the CQI is transmitted is that only when mW-RSs are located away from each other by an appropriate interval, the base station and/or user equipment can check the LoS/NLoS transition.

If the mW-RS is transmitted in a second slot of the subframe in which the CQI is transmitted, it is difficult to maintain the transmission interval between mW-RSs and it has disadvantages in terms of resource efficiency in that overlapping may occur. However, to achieve more accurate downlink channel estimation, the mW-RS can be assigned and transmitted in the subframe containing the CQI under specific conditions.

FIG. 16(b) shows a case in which the mW-RS is assigned to a subframe next to the subframe (or symbol) in which the CQI is transmitted. When the CQI is transmitted either periodically or aperiodically, the rnW-RS can be transmitted once in each slot of the subframe next to the subframe in which the corresponding CQI is transmitted. In other words, since the subframe is composed of two slots, the mW-RS can be transmitted two times.

FIG. 17 shows a method of configuring an interval between mW-RSs by considering a channel transition from the LoS to the NLoS. The interval between the mW-RSs may be designed by considering the condition of Equation 3 below. Alternatively, it may be configured through RRC signaling in advance.

$$\tilde{t}_{noise} \leq RS_{period} < \frac{\tilde{t}_{transition}}{2} \quad \text{[Equation 3]}$$

In Equation 3, $\tilde{t}_{noise}$ indicates a noise fluctuation time, $RS_{period}$ indicates a transmission period of the mW-RS, and $\tilde{t}_{transition}$ indicates a time for which a link is saturated from the LoS to the NLoS or vice versa.

If an interval between two mW-RSs is greater than the condition of Equation 3, when the base station anticipates the transition from the LoS and the NLoS, the base station is highly likely to calculate a power difference between the two reference signals after a certain time elapsed since the NLoS state had started beyond a transition section as shown in FIG. 17(b). Thus, an error may occur in calculating the power difference in the transition section.

On the contrary, if the two mW-RSs are too close to each other, a measurement value may become sensitive to an instantaneous noise or the amount of increase or decrease due to unexpected environmental change as shown in FIG. 17(c). Thus, it may cause a problem in estimating an actual channel. Accordingly, when the interval between the reference signals is appropriately maintained, a relevant slope can be maintained similarly (i.e., high correlation) during the LoS/NLoS transition section.

In case that the transition is performed from the LoS to the NLoS or vice versa, if a power loss slope (measured by the user equipment based on the CRS) has a high correlation characteristic during the transition time, it is possible to configure a new mw RS at low density.

A method for determining a subframe in which the mW-RS is arranged can be defined as shown in Equation 4 below.

$$(10 \times n_f + \lfloor n_s/2 \rfloor N_{OFFSET,CQI} + 1) \bmod N_{pd} = 0 \quad \text{[Equation 4]}$$

Equation 4 is an equation for assigning the mW-RS to the subframe next to the subframe in which the CQI is fed back. Equation 4 is obtained by adding 1 to an equation for determining a location of the subframe to which the CQI is assigned in the case of periodic CQI reporting in the LTE/LTE-A system. According to Equation 4, in the case of the periodic CQI feedback, a location of the subframe to which the mW-RS is assigned can be easily detected. Moreover, the base station can easily decode the mW-RS and then measure a reception power.

In the case of aperiodic CQI feedback, since the base station can check a subframe used for aperiodic CQI reporting through a CSI request field contained in a PDCCH, the mW-RS can be transmitted in a subframe next to the subframe which is used by the UE for triggering the CQI reporting.

Therefore, the base station can easily obtain the transmission location of the mW-RS in the both cases of the periodic CQI reporting and the aperiodic CQI reporting. Basically, the transmission period of the mW-RS may be configured to be shorter than that of the CQI feedback.

3.4 Method of Using SRS and mW-RS

Hereinafter, as one embodiment of the present invention, a method of using not only the mW-RS but also the conventional SRS to enable a base station to detect a LoS/NLoS transition will be described.

Figure 18:
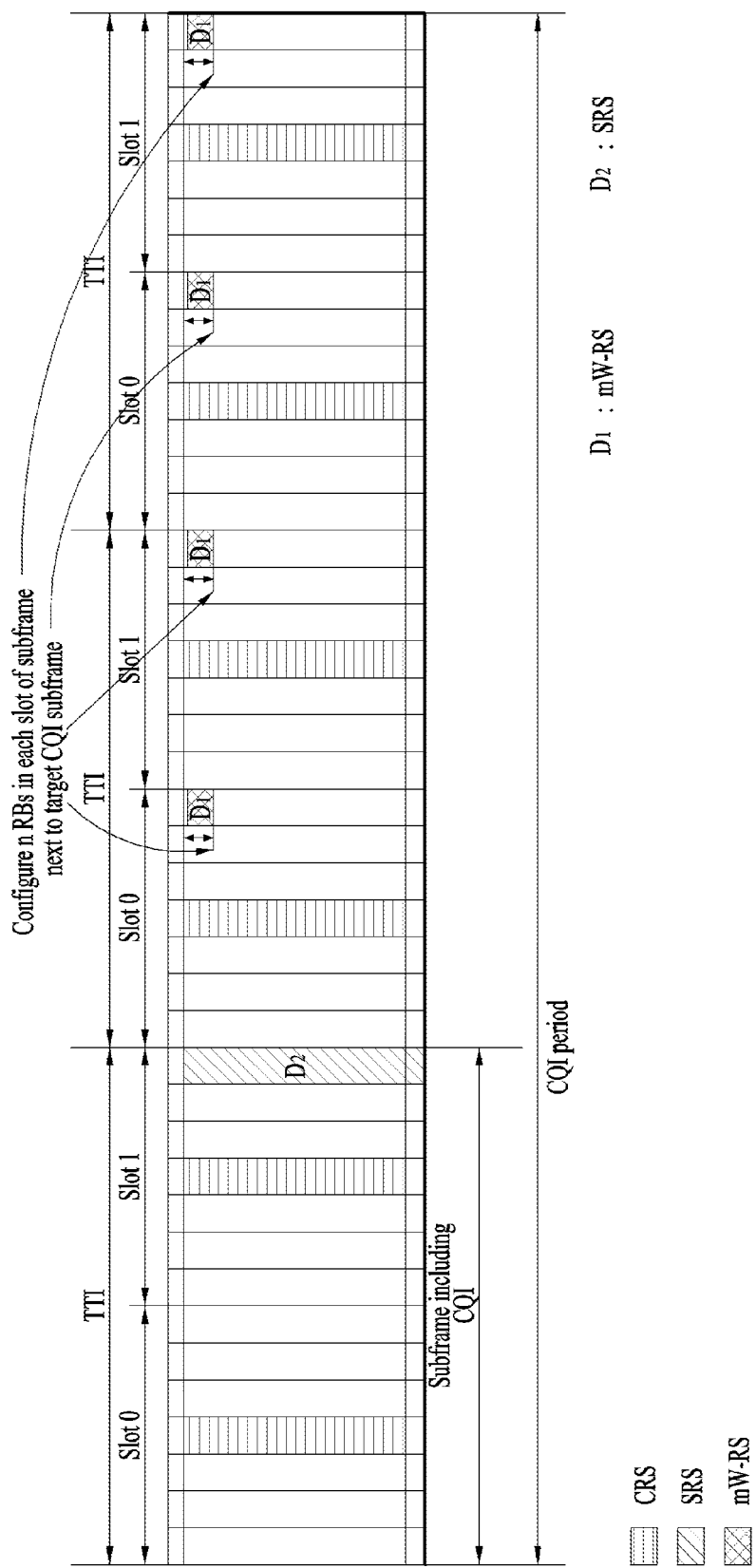
FIG. 18 is a diagram for explaining an example of a method of using an SRS and an mW-RS for LoS/NLoS measurement.

FIG. 18 is a diagram for explaining an example of a method of using an SRS and an mW-RS for LoS/NLoS measurement.

Referring to FIG. 18, a user equipment may transmit, to a base station, a predetermined number of mW-RSs from a subframe next to the subframe in which a CQI is transmitted. That is, the user equipment may transmit the mW-RSs in four consecutive slots (i.e., two subframes) to the base station.

Thus, the base station may measure reception power D1 based on the four mW-RSs. In addition, the base station may measure reception power D2 based on an SRS transmitted in the subframe in which the CQI is transmitted.

The base station may calculate an instantaneous power level difference based on the reception powers measured using the SRS and the mW-RSs and then determine the moment at which downlink is switched from the LoS to the NLoS. Thereafter, the base station may adjust recently obtained information such as CQI, MCS, RV, etc. based on the reception powers measured by itself, determine a DCI format suitable for the LoS/NLoS transition situation, and then transmit the determined DCI format in downlink.

In another aspect of the present invention, if a LoS/NLoS transition time is longer than four subframes and the SRS is already assigned to the subframe supposed to be used for the mW-RS assignment, an uplink SRS (2 ms SRS configuration) may be utilized.

Figure 19:
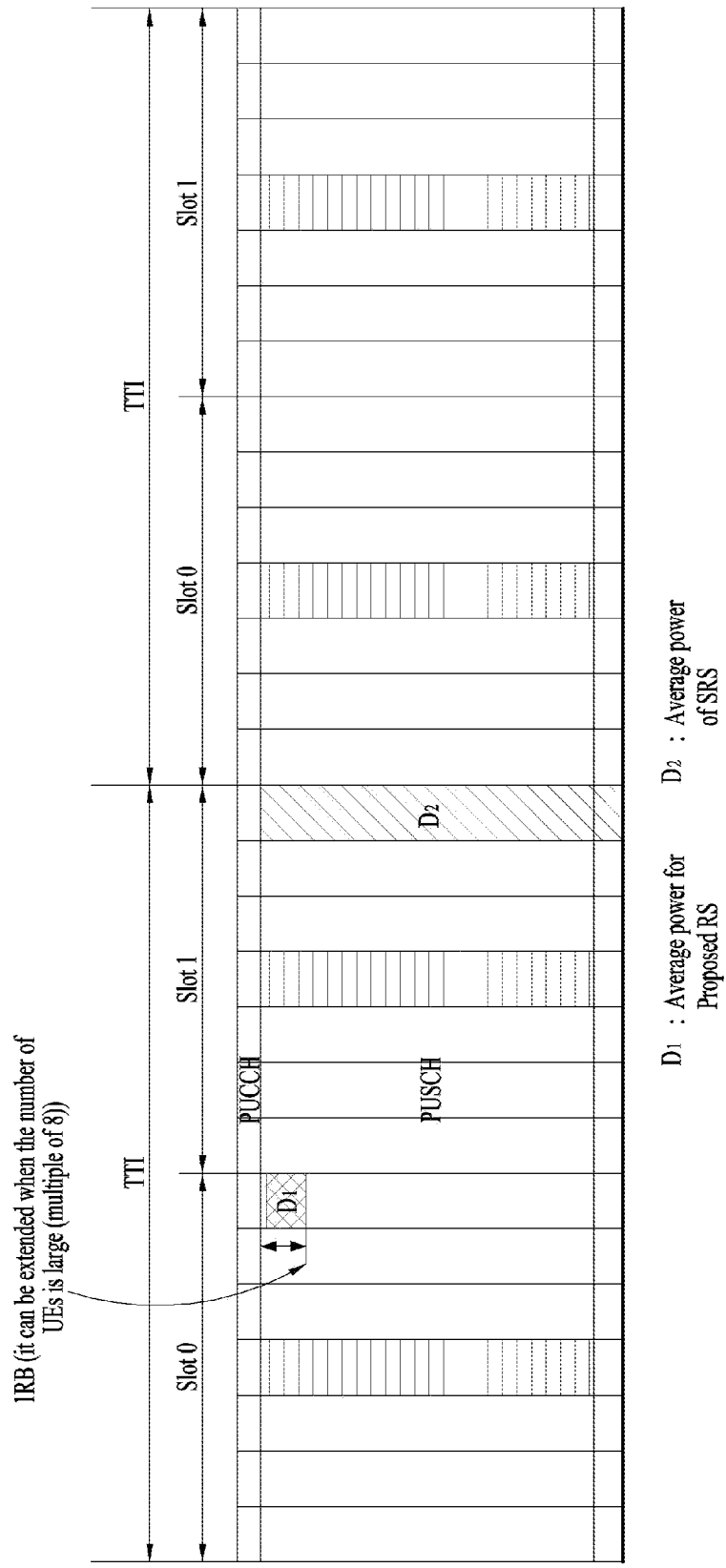
FIG. 19 is a diagram for explaining another example of a method of using an SRS and an mW-RS for LoS/NLoS measurement.

FIG. 19 is a diagram for explaining another example of a method of using an SRS and an mW-RS for LoS/NLoS measurement.

In another aspect of the present invention, if a LoS/NLoS transition time is shorter than two-subframe length on the assumption that TA (time advance) is performed in the 3GPP LTE/LTE-A system, an mW-RS may be assigned to the last SC-FDMA symbol of a slot before the slot to which an SRS is assigned.

When a user equipment transmits the mW-RS to a base station, the base station may measure a reception power based on the received mW-RS. For instance, the base station may check which user equipment transmits the mW-RS and calculate an average reception power of mW-RSs by performing convolution on the mW-RS and a Zadoff-chu sequence with a correlation sequence. Thereafter, the base station may calculate a mean difference of reception powers of SRSs received in the subframes in which the mW-RSs are received and then anticipate a time at which data will be transmitted in downlink. By doing so, the base station may generate a new MCS using the most recently received CQI information as shown in Equation 5 and then transmit information on the generated MCS in downlink.

After receiving the SRS and mW-RS described with reference to FIG. 19, the base station may need a processing time in order to measure the reception power and update the CQI at the same time. In this case, it is preferred to set the processing time to be short.

$$I_{MCS,new}(D_{SRS}, \tilde{\tau}) = \lfloor I_{MCS}(P_{min}(I_{MCS,present}) - D_{SRS}\tilde{\tau}) \rfloor \quad \text{[Equation 5]}$$

In Equation 5, $I_{MCS,present}$ indicates an MCS index determined through the recent CQI in the current state, and $D_{SRS}$ indicates a reception power difference between the mW-RS and the SRS, which are received by the base station from the user equipment. $P_{min}(I_{MCS,present})$ indicates a minimum reception power satisfying the current MCS, $I_{MCS,new}$ indicates a new MCS index transmitted by the base station to the user equipment in consideration of the LoS/NLoS transition situation, and $\tilde{\tau}$ indicates a reception power difference occurring between a time at which the base station receives $D_{SRS}$ and a time at which downlink transmission starts.

If a slope of power differences between uplink reference signals (e.g., SRS, mW-RS, etc.) is not similar to one another, the base station may continuously calculate $I_{MCS,new}$ in the open-loop recursive form by continuously accumulating the power differences between the reference signals or $D_{SRS,i}$. Equation 6 below defines a method for a base station to calculate a new MCS index by accumulating reception powers measured from reference signals in the recursive form.

$$I_{MCS,new,i+1}(D_{SRS}, \tilde{\tau}_{i-1}) = \lfloor I_{MCS}(P_{min}(I_{MCS,new,i}) - D_{SRS,i}\tilde{\tau}_i) \rfloor \quad \text{[Equation 6]}$$

Additionally, the base station can anticipate an MCS level more accurately by applying offset α in consideration of a transition slope difference between frequencies. Equation 7 below defines a method of calculating an MCS index by applying an offset.

$$I_{MCS,new}(D_{SRS}, \tilde{\tau}) = \lfloor I_{MCS}(P_{min}(I_{MCS,present}) - \alpha D_{SRS}\tilde{\tau}) \rfloor \quad \text{[Equation 7]}$$

In this case, the base station may previously inform the user equipment of the offset α through an RRC layer by considering a frequency difference between uplink and downlink.

Figure 20:
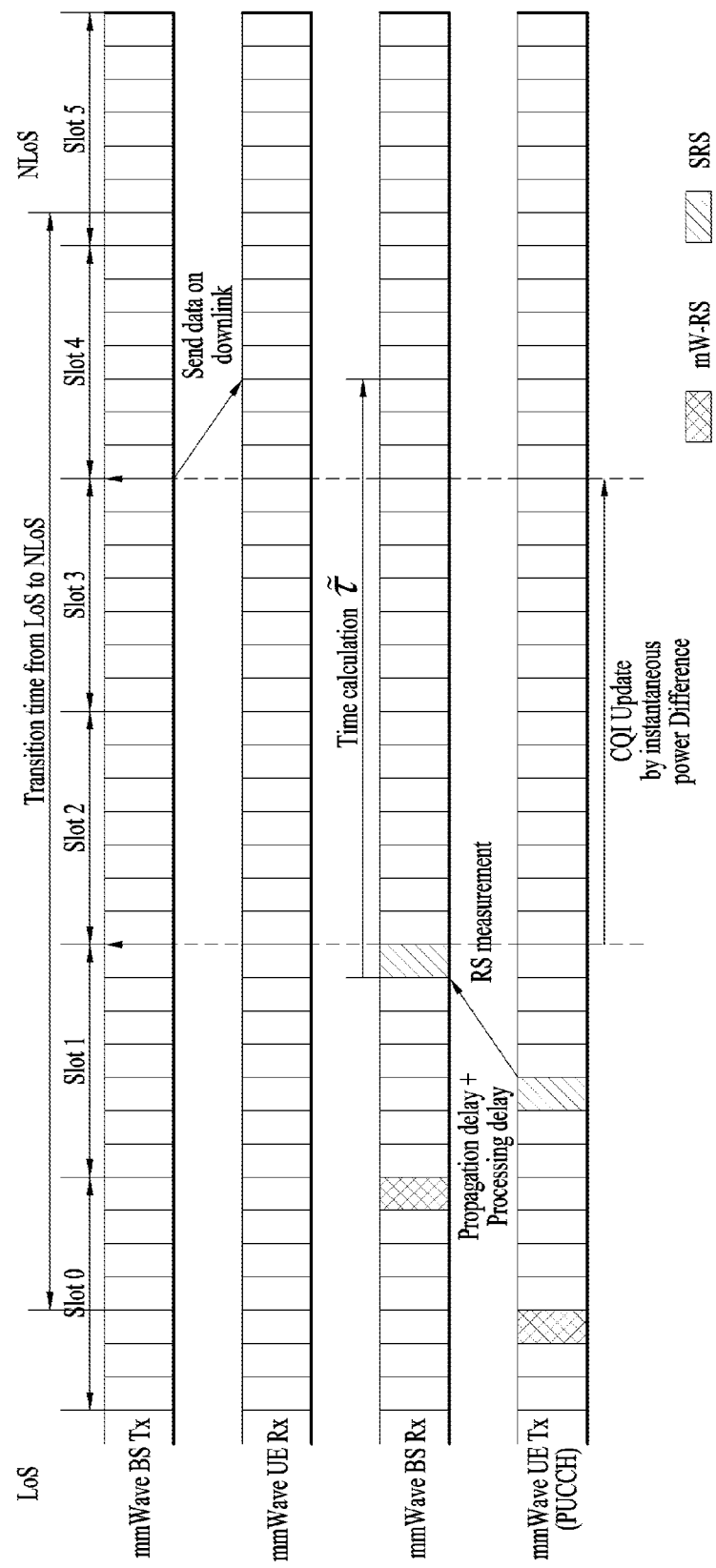
FIG. 20 is a diagram illustrating a time sequence of transmitting the SRS and the mW-RS described in FIG. 19.

FIG. 20 is a diagram illustrating a time sequence of transmitting the SRS and the mW-RS described in FIG. 19. In particular, the user equipment may transmit the mW-RS in the subframe in which the SRS is transmitted and thus the base station can check the LoS-NLoS transition.

3.5 Uplink Synchronization

In order to apply the above-described mW-RS, reception synchronization between a base station and a user equipment should be performed. If the synchronization is not performed, the base station cannot know when the mW-RS is transmitted. To synchronize with the mmWave user equipment, the base station may transmit an RRC signal containing mW-RS configuration information and synchronization related information semi-statically.

3.6 mW-RS Transmission Method Using CQI

When a user equipment transmits CSI feedback containing a CQI, the user equipment may add a flag indicating whether the mW-RS configuration is enabled or disabled to CQI payload. In this case, a base station or a network may previously transmit configuration information on the mW-RS to the user equipment through RRC in consideration of signaling overhead. The configuration information transmitted through the RRC may include the following items.

Figure 21:
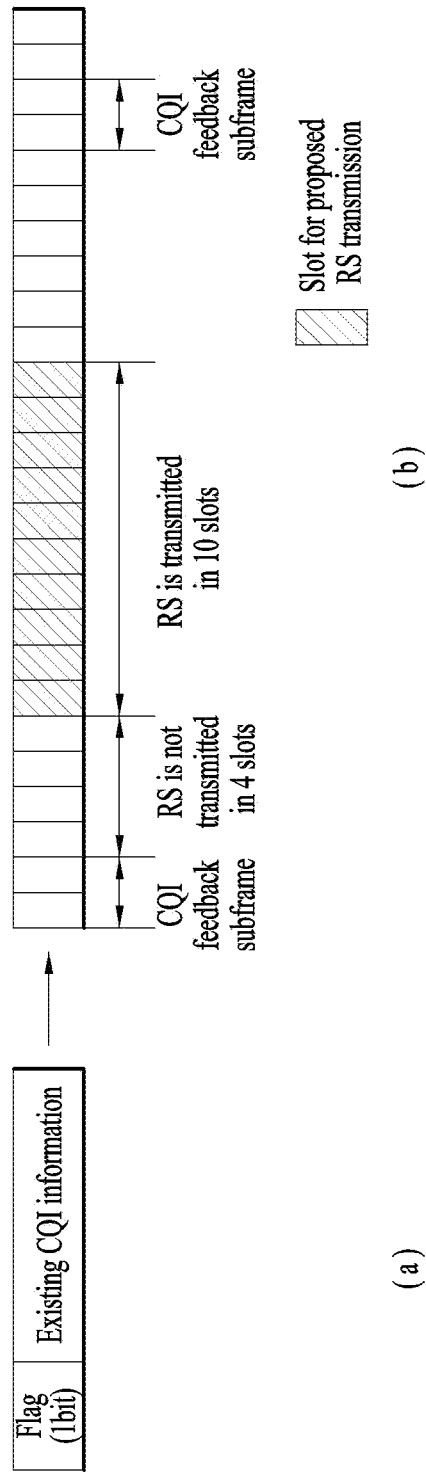
FIG. 21 is a diagram illustrating an example of transmission according to CQI payload containing a flag indicating whether an mW-RS is enabled and an RRC configuration.

(1) A total transmission length of the mW-RS
(2) The number of RBs on the frequency axis of the mW-RS
(3) The number of times of transmission of the mW-RS
(4) An interval in which the mW-RS is actually transmitted of the total transmission length of the mW-RS
(5) An index of a subframe in which the mW-RS is transmitted
(6) An assignment location of the mW-RS
(7) An offset value for indicating a time at which the mW-RS transmission is scheduled after CQI feedback transmission FIG. 21 is a diagram illustrating an example of transmission according to CQI payload containing a flag indicating whether an mW-RS is enabled and an RRC configuration.

FIG. 21(a) shows CQI payload including a 1-bit flag. When the 1-bit flag is set to '1', it means that the mW-RS is enabled. On the contrary, when the 1-bit flag is set to '0', it means that the mW-RS is disabled.

FIG. 21(b) shows an example of a method of transmitting the CQI feedback and the mW-RS. Referring to FIG. 21(b), it can be checked that the first two subframes are used for the CQI feedback and the mW-RS transmission is not performed during the following four slots. However, in the next ten slots, the mW-RS is transmitted.

Although the above-mentioned method has advantages in terms of overhead, it has also disadvantages in that transition-related information should be provided to the base station in a short term in an environment where the LoS/NLoS transition occurs frequently. Thus, minimum information for adaptively handling the LoS/NLoS transition can be added to the CQI payload and other necessary information may be informed the user equipment through the RRC in advance.

In another aspect of the present embodiment, to cope with the LoS/NLoS transition adaptively, a method for further including not only the aforementioned flag but also the configuration information on the mW-RS to the CQI payload to be transmitted by the user equipment will be described. In this case, the added configuration information on the mW-RS includes the following items.

Figure 22:
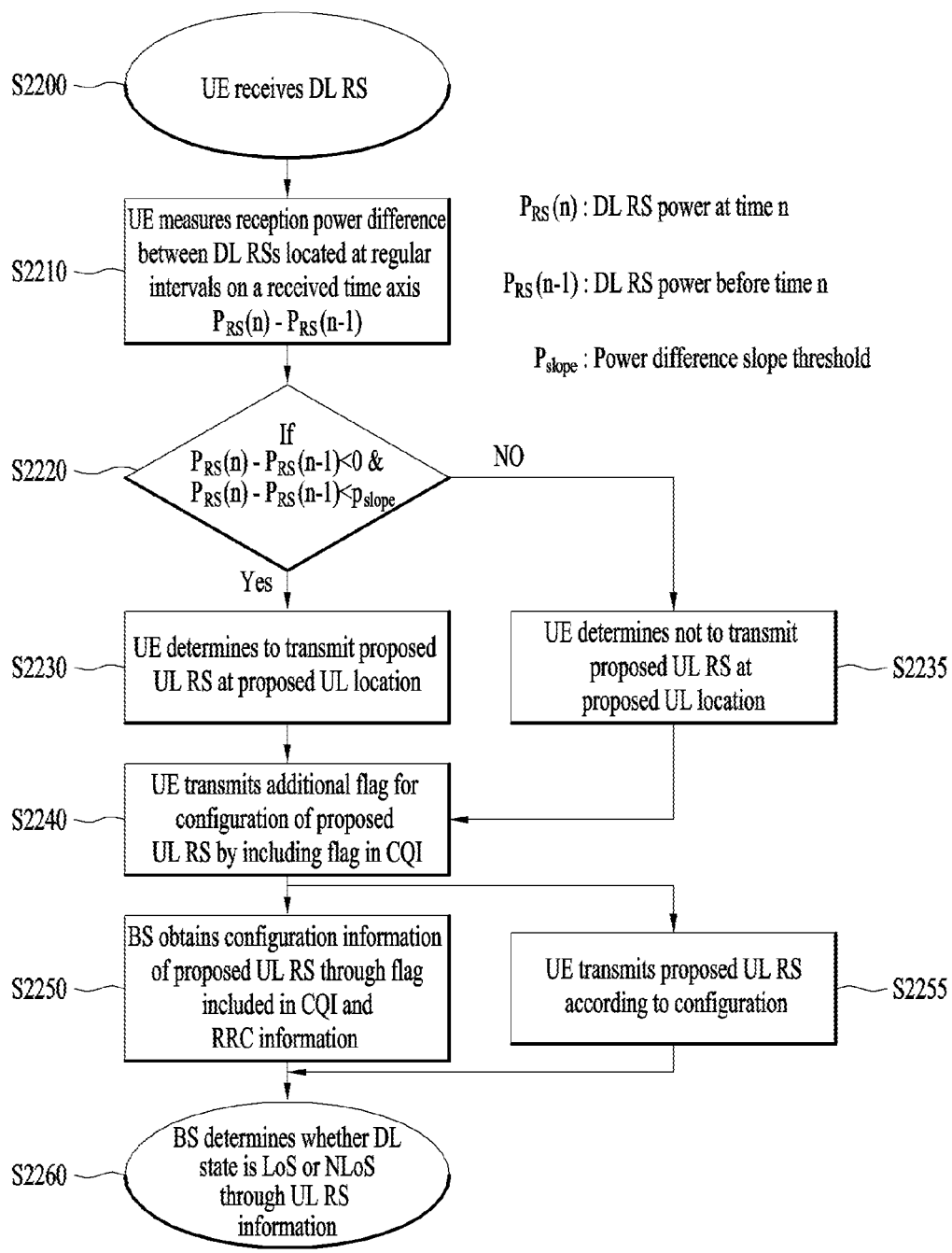
FIG. 22 is a diagram for explaining another method for a base station to measure a reception power and adjust scheduling information based on a new mW-RS when a LoS/NLoS transition occurs.

(1) A transmission length of the mW-RS
(2) The number of the mW-RSs
(3) A mw-RS enable/disable flag
(4) A period pattern of the mW-RS
(5) A mw-RS release/connect flag for reducing overhead FIG. 22 is a diagram for explaining another method for a base station to measure a reception power and adjust scheduling information based on a new mW-RS when a LoS/NLoS transition occurs.

Referring to FIG. 22, an mmWave user equipment may receive a downlink reference signal (e.g., CRS) [S2200].

The user equipment may measure a reception power difference between CRSs transmitted at regular intervals on a received time axis [S2210].

In the step S2210, $P_{RS}(n)$ means a CRS reception power in time n or subframe n and $P_{RS}(n-1)$ means a CRS reception power in subframe (n−1) prior to the time n.

The user equipment checks whether the reception power measured based on the CRSs satisfy the conditions mentioned in step S2220 of FIG. 22. [S2220].

If the conditions are satisfied, the user equipment may determine to transmit the mW-RS by determining that the LoS/NLoS transition has been occurred. If the conditions are not satisfied, the user equipment may determine not to transmit the mW-RS [S2230 and S2235].

When the user equipment intends to transmit the mW-RS, the user equipment transmits the mW-RS in a subframe next to the subframe where periodic CQI transmission or aperiodic CQI transmission is performed. In addition, in order to inform whether the mW-RS is transmitted, the user equipment may include the above-mentioned 1-bit flag or mW-RS configuration information in the CQI payload and then transmit the CQI payload when transmitting the CQI periodically or aperiodically [S2240 and S2255].

After receiving the periodic or aperiodic CQI, the base station may check, through the flag contained in the payload, whether the mW-RS is transmitted in the next subframe. In addition, when the mW-RS configuration information is included in the CQI payload, the base station may receive the mW-RS according to the configuration information [S2250].

The base station may check whether the LoS/NLoS transition occurs by measuring a reception power with respect to the mW-RS. Moreover, the base station may configure scheduling information suitable for the LoS/NLoS transition situation based on channel information obtained through the recently received CQI and the reception power obtained from the mW-RS and then transmit the configured scheduling information to the user equipment [S2260].

3.6.1 Periodic mW-RS Transmission Method

Hereinafter, a description will be given of a method of transmitting an mW-RS periodically.

Figure 23:
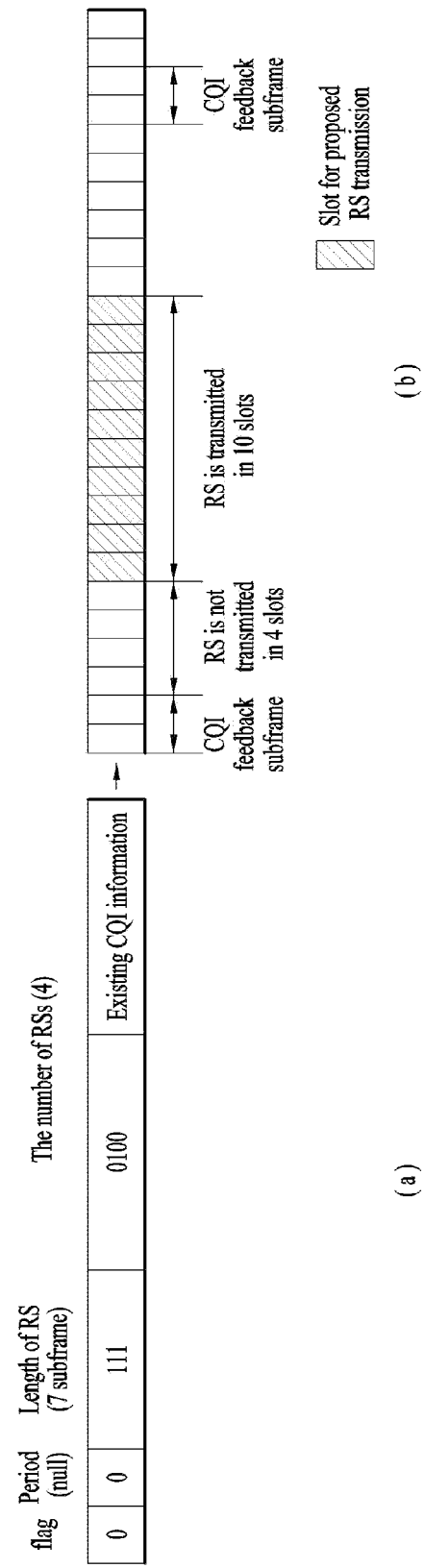
FIG. 23 is a diagram for explaining another example of CQI payload containing configuration information on an mW-RS.

FIG. 23 is a diagram for explaining another example of CQI payload containing configuration information on an mW-RS.

When a user equipment transmits the mW-RS periodically, the user equipment may transmit configuration information on the mW-RS by including the configuration information in CQI payload. In this case, the configuration information on the mW-RS include the following items.

(1) Reference signal transmission length filed: If mW-RS length information is configured on a subframe basis (e.g., 1 subframe, 2 subframes or up to 7 subframes), a transmission length field of 3-bit is required. In this case, a subframe transmission length index may be configured through an RRC signal in advance.

(2) Reference signal transmission number filed: This filed indicates how many slots are present before mW-RS transmission. For instance, in case that 7 subframes are used for reference signal transmission, if the mW-RS is transmitted in the remaining slots except 4 slots, the filed may be represented as 4 bits to indicate the mW-RS transmission in the remaining slots.

(3) Reference signal period pattern: A relevant period is provided by RRC and a 1-bit flag indicating whether the period is provided or not is added to the CQI payload.

That is, final nine more additional bits can be further included in the CQI payload.

For instance, the flag filed indicates whether the mW-RS is transmitted in the next subframe and the period filed indicates whether the mW-RS is transmitted periodically. In addition, the reference signal number filed indicates the number of transmitted mW-RSs.

3.6.2 Aperiodic mW-RS Transmission Method

Figure 24:
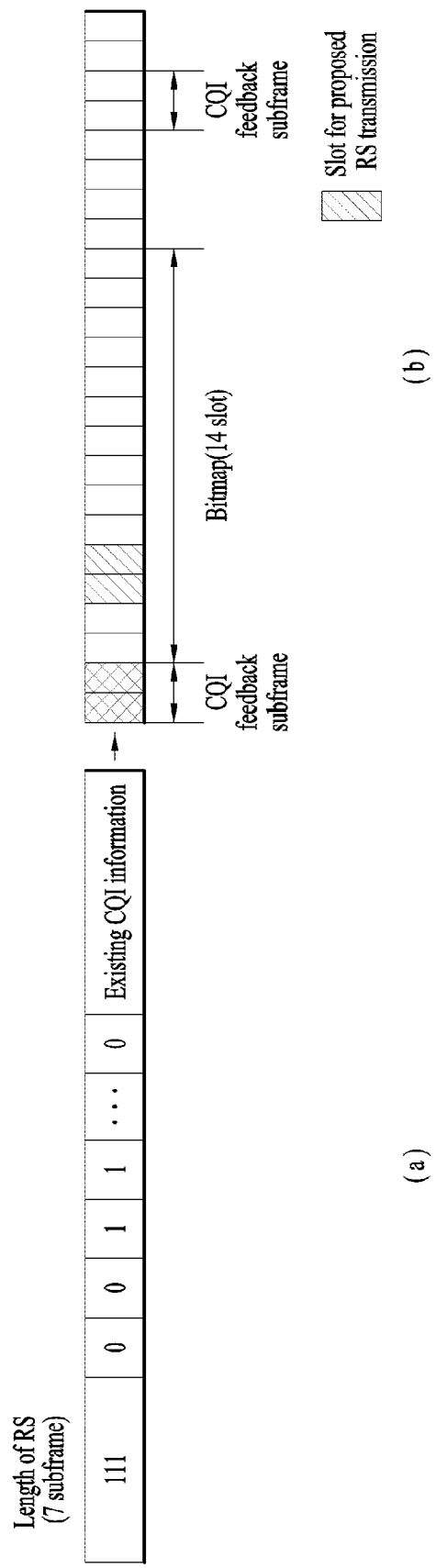
FIG. 24 is a diagram for explaining a further example of CQI payload containing configuration information on an mW-RS.

FIG. 24 is a diagram for explaining a further example of CQI payload containing configuration information on an mW-RS.

A user equipment may configure and transmit the mW-RS aperiodically. When intending to transmit the mW-RS, the user equipment may indicate a time at which the mW-RS is transmitted by using a bitmap.

Referring to FIG. 24(a), a reference signal length filed and a 14-bit bitmap may be further included in the CQI payload. The reference signal length filed may mean a length of subframes in which the mW-RS is transmitted and has a size of 4 bits. In addition, when 4 bits are set to '1111', it indicates that the mW-RS may be transmitted in 7 subframes appearing after the subframe in which a CQI is transmitted. In this case, the mW-RS is not transmitted in a slot set to '0' on the bitmap. On the contrary, the mW-RS is transmitted in a slot set to '1' on the bitmap. In other words, referring to FIG. 24(b), when the bitmap is set to '001100000000', the mW-RS is transmitted only in third and fourth slots after the CQI transmission subframe and it is not transmitted in the remaining slots.

3.7 mW-RS Transmission Method

Hereinafter, a description will be given of a case in which CQI transmission is omitted when mW-RS transmission needs to be performed.

Figure 25:
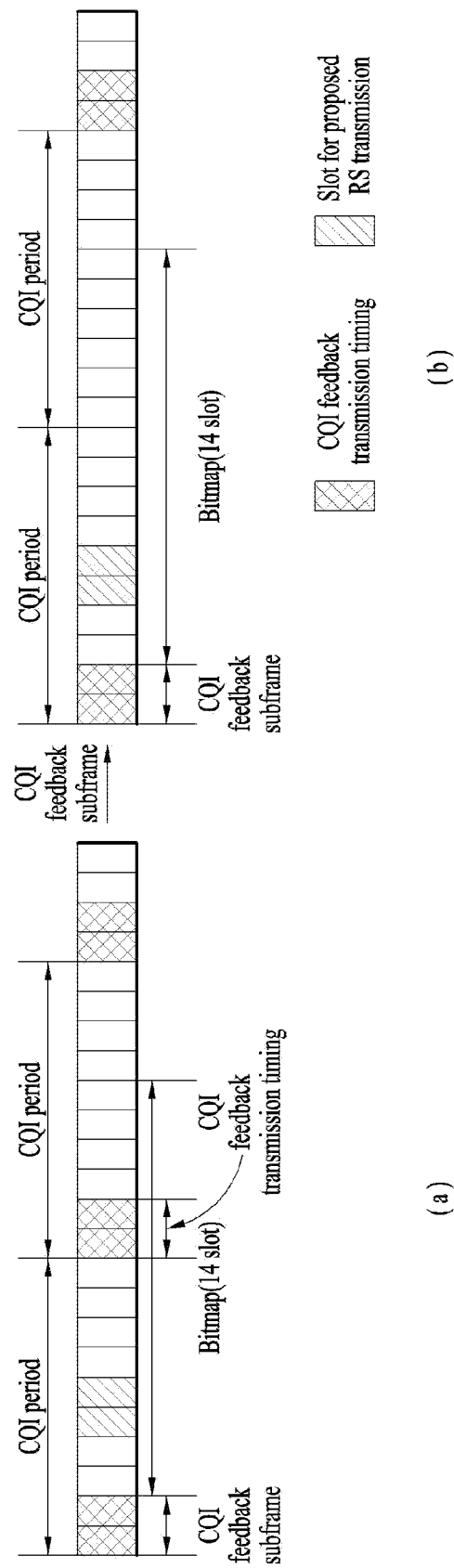
FIG. 25 is a diagram illustrating an example of a method of operating CQI feedback in mW-RS transmission.

FIG. 25 is a diagram illustrating an example of a method of operating CQI feedback in mW-RS transmission.

FIG. 25 shows a case in which mW-RS transmission has priority over CQI feedback. Particularly, FIG. 25(a) shows a case in which the CQI transmission is performed together with the mW-RS transmission and FIG. 25(b) shows a case in which, if the mW-RS transmission is performed after the CQI transmission, the CQI transmission is not performed in a next period. In FIG. 25, it is assumed that a CQI transmission period is 5-subframe.

Figure 26:
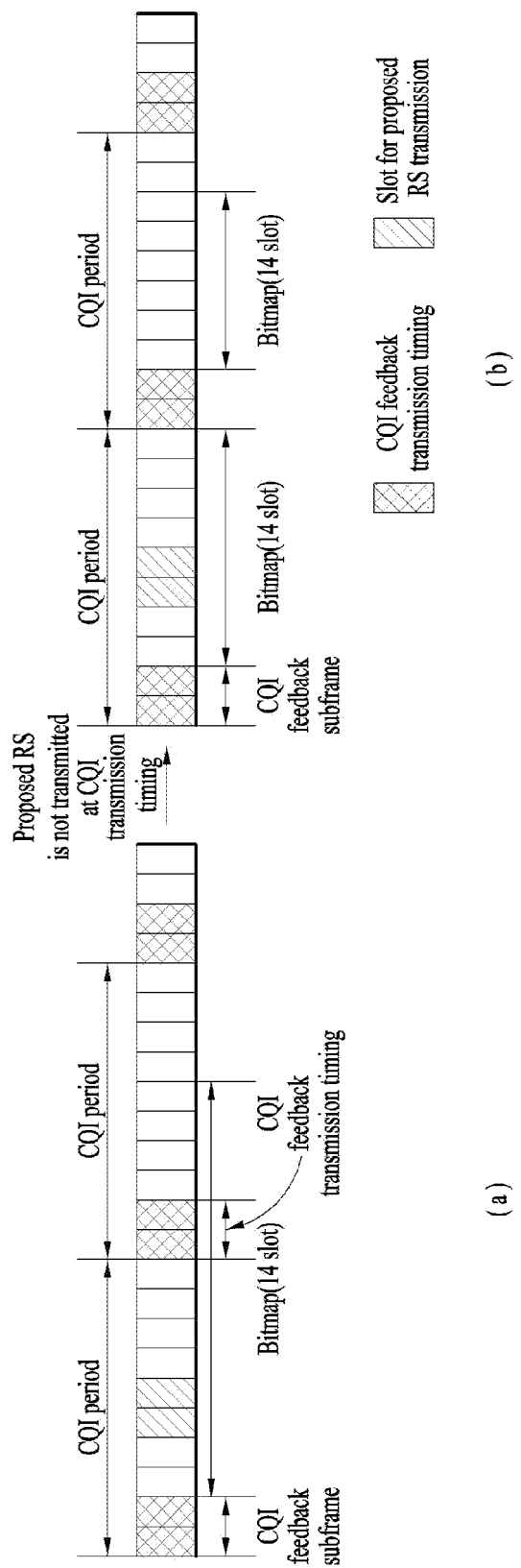
FIG. 26 is a diagram illustrating another example of a method of operating CQI feedback in mW-RS transmission.

FIG. 26 is a diagram illustrating another example of a method of operating CQI feedback in mW-RS transmission.

Particularly, FIG. 26 is a diagram for explaining a method of giving priority to CQI feedback over mW-RS transmission. FIG. 26(a) is identical to FIG. 25(a). However, according to FIG. 26(b), when a length of the mW-RS is longer than a CQI feedback period, a user equipment may not transmit the mW-RS in a subframe in which the CQI feedback is transmitted.

Figure 27:
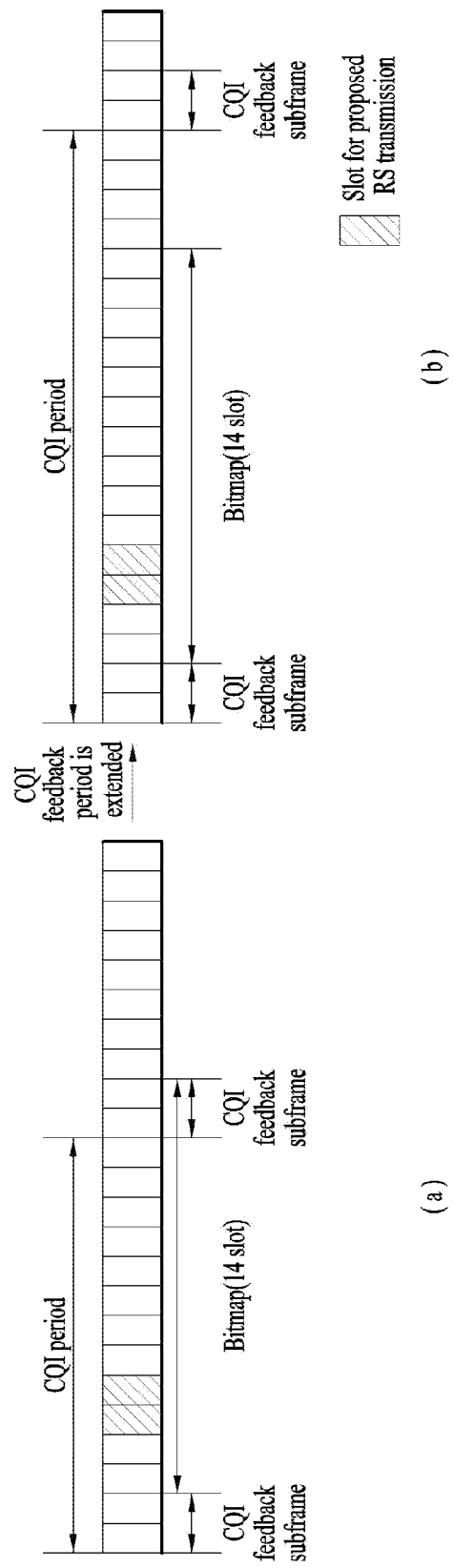
FIG. 27 is a diagram illustrating another example of a method of operating CQI feedback in mW-RS transmission.

FIG. 27 is a diagram illustrating another example of a method of operating CQI feedback in mW-RS transmission.

Particularly, FIG. 27 illustrates a method of reconfiguring a CQI transmission period to prevent overlapping between CQI feedback and an mW-RS when the CQI feedback and the mW-RS are transmitted in the subframe.

Referring to FIG. 27, when the mW-RS transmission needs to be performed during the CQI transmission period, the CQI transmission is not performed during the corresponding period. Moreover, the CQI feedback may be configured to be transmitted after the subframe assigned for the mW-RS transmission by increasing the CQI transmission period.

Figure 28:
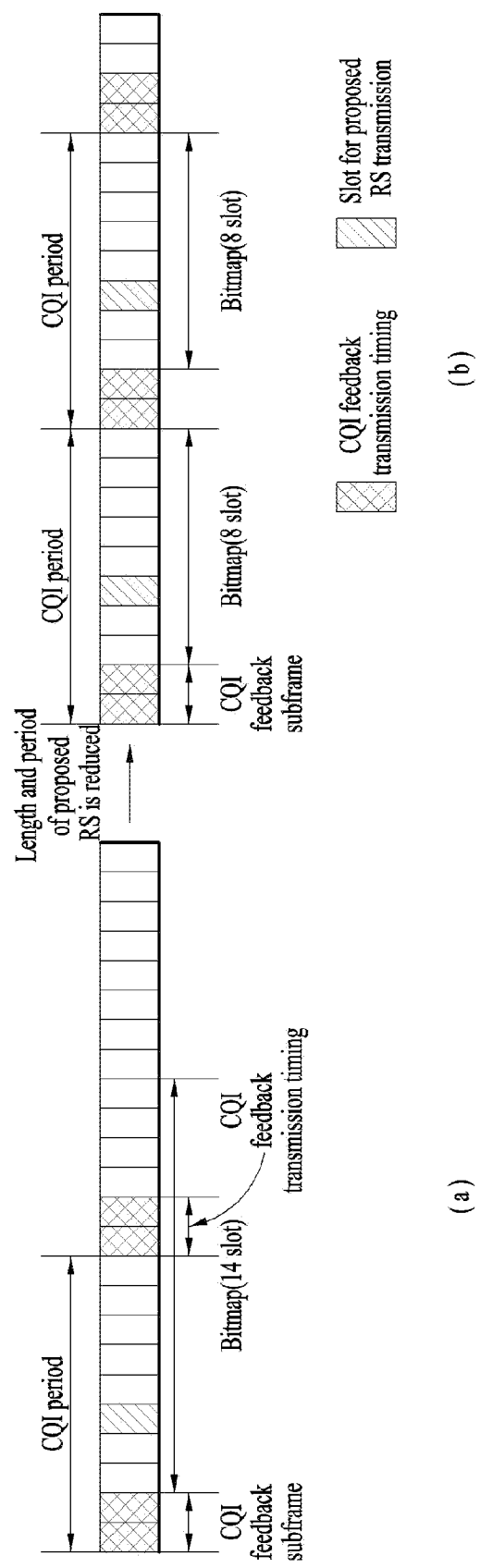
FIG. 28 is a diagram illustrating a further example of a method of operating CQI feedback in mW-RS transmission.

FIG. 28 is a diagram illustrating a further example of a method of operating CQI feedback in mW-RS transmission.

Referring to FIG. 28, when the CQI feedback and the mW-RS are transmitted together in the same subframe, the length of the mW-RS may be readjusted in order to prevent overlapping between the CQI feedback and the mW-RS.

4. Apparatuses

Figure 29:
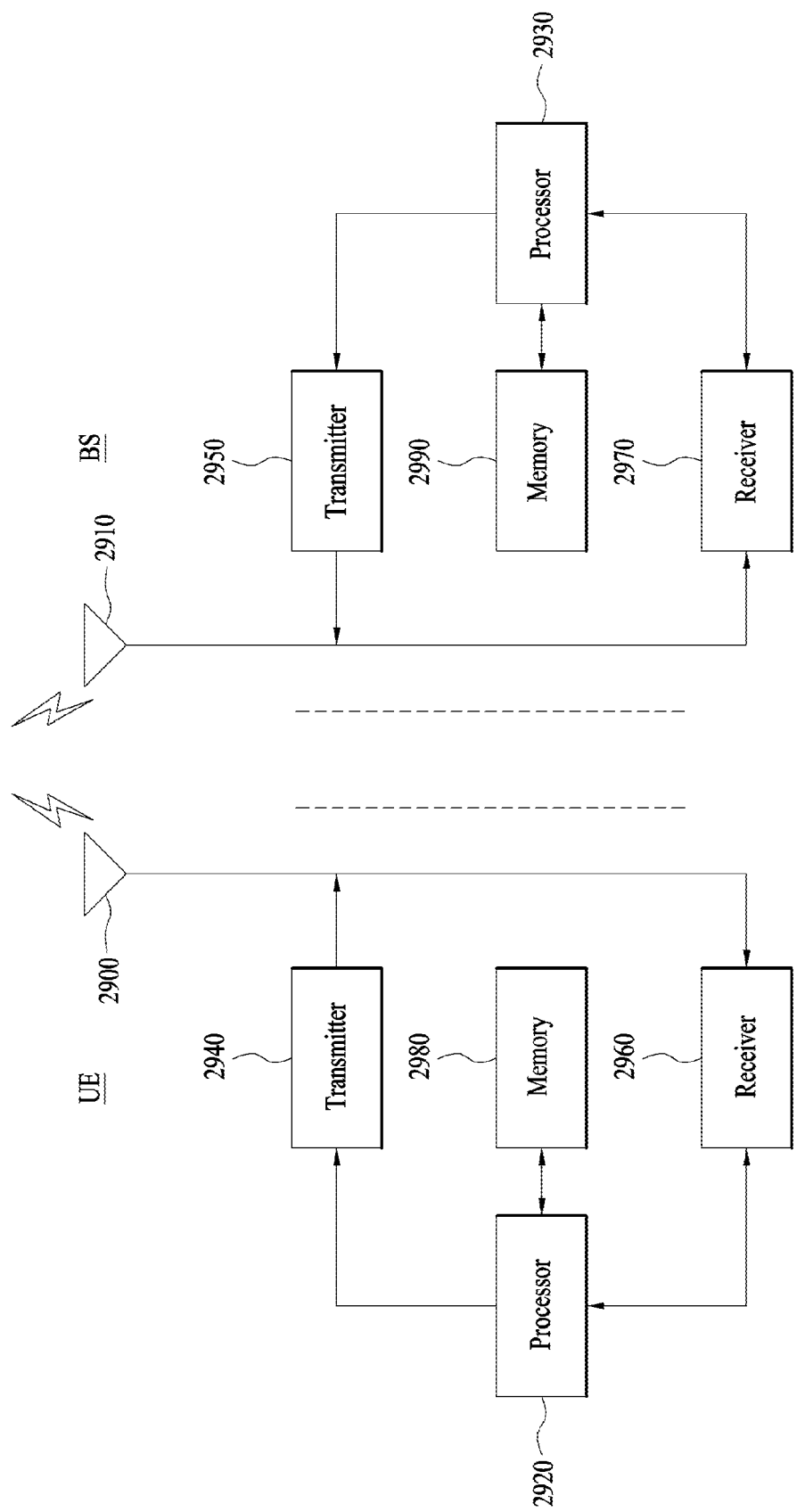
FIG. 29 illustrates apparatuses for implementing the methods described in FIGS. 1 to 28.

Apparatuses illustrated in FIG. 29 are means that can implement the methods described before with reference to FIGS. 1 to 28.

A UE may act as a transmission end on a UL and as a reception end on a DL. An eNB may act as a reception end on a UL and as a transmission end on a DL.

That is, each of the UE and the eNB may include a Transmitter (Tx) 2940 or 2950 and a Receiver (Rx) 2960 or 2970, for controlling transmission and reception of information, data, and/or messages, and an antenna 2900 or 2910 for transmitting and receiving information, data, and/or messages.

Each of the UE and the eNB may further include a processor 2920 or 2930 for implementing the afore-described embodiments of the present disclosure and a memory 2980 or 2990 for temporarily or permanently storing operations of the processor 2920 or 2930.

The embodiments of the present invention can be implemented based on the above-described components and functions of the UE and the eNB. For example, the processor of the eNB may previously allocate an uplink channel region for SRS transmission between small cells by combining the methods disclosed in sections 1 to 5. In addition, the processor of the eNB may control the transmitter to explicitly transmit, to the UE, resource allocation information with respect to the allocated channel region through a higher layer signal. Moreover, the processor of the UE may generate an SRS based on an SRS transmission parameter received through the higher layer signal and then transmit the generated SRS through the channel region indicated by the SRS transmission parameter. Details can be found in sections 1 to 5.

The transmitter and the receiver of the UE and the eNB may perform a packet modulation/demodulation function for data transmission, a high-speed packet channel coding function, OFDMA packet scheduling, TDD packet scheduling, and/or channelization. Each of the UE and the eNB of FIG. 29 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2980 or 2990 and executed by the processor 2920 or 2930. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of transmitting millimeter wave reference signals (mW-RSs) in a wireless access system supporting a millimeter wave (mmWave), the method comprising:
   receiving, by a user equipment (UE) from an evolved Node B (eNB), downlink reference signals in a predetermined number of subframes;
   measuring at least two reception powers based on the downlink reference signals;
   transmitting, by the UE to the eNB, the channel quality indicator (CQI) information at a subframe number n; and
   transmitting, by the UE to the eNB, the mW-RSs at a subframe number n+1, when a radio channel transition between a Line-of-Sight (LoS) state and a Non-LoS (NLoS) state has been detected based on a difference value between that at least two reception powers.

2. The method of claim 1, wherein the CQI information further comprises a 1-bit flag indicating whether the mW-RSs are transmitted.

3. The method of claim 1, wherein the CQI information further comprises at least one of a flag indicating whether the mW-RSs are transmitted, a field indicating a transmission length of the m W-RSs, a field indicating a number of the mW-RSs, a field indicating whether the mW-RSs are transmitted periodically, and a field indicating whether a transmission of the mW-RSs are released or continued.

4. The method of claim 1, further comprising receiving an index ($I_{MCS}$) indicating a modulation and coding scheme (MCS) adjusted based on the CQI information and the in mW-RSs.

5. A user equipment (UE) for transmitting millimeter wave reference signals (mW-R,Ss) in a wireless access system supporting a millimeter wave (nmWave), the LIE comprising:
   a transmitter;
   a receiver; and
   a processor configured to support the mmWave by controlling the transmitter and the receiver,
   wherein the processor controls the receiver to receive, from an evolved Node B (eNB), downlink reference signals in a predetermined number of subframes,
   measures at least two reception powers based on the downlink reference signals,
   controls the transmitter to transmit, to the eNB, channel quality indicator (CQI) information at a subframe number n, and
   controls the transmitter to transmit, to the eNB, the mW-RSs at a subframe number n+1, when a radio channel transition between a Line-of-Sight (LoS) state and a Non-LoS (NLoS) state has been detected based on a difference value between the at least two reception power.

6. The user equipment of claim 5, wherein the CQI information further comprises a 1-bit flag indicating whether the mW-RSs are transmitted.

7. The user equipment of claim 5, wherein the CQI information further comprises at least one of a flag indicating whether the mW-RSs are transmitted, a field indicating a transmission length of the mW-RSs, a field indicating a number of the mW-RSs, a field indicating whether mW-RSs are transmitted periodically, and a field indicating whether a transmission of the mW-RSs are released or continued.

8. The user equipment of claim 5, wherein the processor is further configured to receive an index ($I_{MCS}$) indicating a modulation and coding scheme (MCS) adjusted based on the CQI information and the mW-RSs through the receiver.

* * * * *